US012453946B2

(12) United States Patent
Mercado Alvarado

(10) Patent No.: US 12,453,946 B2
(45) Date of Patent: Oct. 28, 2025

(54) LIQUID POLYMER DOSING AND MIXING CHAMBER AND PUMP

(71) Applicant: Adalberto Mercado Alvarado, Bayamon, PR (US)

(72) Inventor: Adalberto Mercado Alvarado, Bayamon, PR (US)

( * ) Notice: Subject to any disclaimer, the term of this patent is extended or adjusted under 35 U.S.C. 154(b) by 606 days.

(21) Appl. No.: 17/889,016

(22) Filed: Aug. 16, 2022

(65) Prior Publication Data

US 2022/0395790 A1 Dec. 15, 2022

Related U.S. Application Data

(63) Continuation-in-part of application No. 17/577,224, filed on Jan. 17, 2022, which is a continuation-in-part of application No. 17/471,546, filed on Sep. 10, 2021, now Pat. No. 12,303,917, which is a continuation-in-part of application No. 17/164,367, filed on Feb. 1, 2021, now Pat. No. 12,233,388, which is a continuation-in-part of application No. 16/906,882, filed on Jun. 19, 2020, now Pat. No. 11,766,644, which is a continuation-in-part of application No. 15/787,758, filed on Oct. 19, 2017, now Pat. No. 10,766,011.

(51) Int. Cl.

| | |
|---|---|
| ***B01F 35/53*** | (2022.01) |
| ***B01F 27/25*** | (2022.01) |
| ***B01F 35/32*** | (2022.01) |
| ***B01F 35/71*** | (2022.01) |
| *B01F 101/00* | (2022.01) |

(52) U.S. Cl.

CPC .............. *B01F 35/53* (2022.01); *B01F 27/25* (2022.01); *B01F 35/3204* (2022.01); *B01F 35/32045* (2022.01); *B01F 35/7176* (2022.01); *B01F 35/718* (2022.01); *B01F 2101/2805* (2022.01)

(58) Field of Classification Search

CPC .................. B01F 35/53; B01F 35/7176; B01F 35/32045; B01F 27/25

See application file for complete search history.

(56) References Cited

U.S. PATENT DOCUMENTS 3,920,779 A * 11/1975 Abele .................. B01F 23/233 261/87
4,242,199 A * 12/1980 Kelley ................. B01F 23/454 210/197
4,378,165 A * 3/1983 Landberg ............... B01F 27/91 366/270
4,512,936 A * 4/1985 Oshima .................. B01F 27/25 210/219

(Continued)

FOREIGN PATENT DOCUMENTS

GB 2095570 A * 10/1982 ................ B01F 5/10
WO WO-8702907 A1 * 5/1987
WO WO-2007023864 A1 * 3/2007 .......... B01F 13/0827

*Primary Examiner* — Marc C Howell

(74) *Attorney, Agent, or Firm* — Eugenio J. Torres-Oyola; Victor M. Rodriguez-Reyes; Rafael Rodriguez-Muriel

(57) ABSTRACT

A liquid polymer dosing and mixing chamber and pump having a hollow chamber, a blending reactor, a progressive cavity pump, a mixing cup, a submersible actuator, and an aging cup within the hollow chamber adapted to create doses, via the progressive cavity pump, of a first substance and to mix it with one or more substances introduced into the blending reactor via one or more inlets.

19 Claims, 26 Drawing Sheets

(56) References Cited

U.S. PATENT DOCUMENTS 4,650,342 A * 3/1987 Goodwin ................ B01F 27/81
366/264
4,720,361 A * 1/1988 Andersson .......... B01F 23/2331
261/87
4,917,577 A * 4/1990 Stirling ............. B01F 23/23342
417/66
5,011,372 A * 4/1991 Nigrelli ................... C02F 3/165
416/85
5,043,104 A * 8/1991 Stirling ............. B01F 25/31242
210/219
5,085,809 A * 2/1992 Stirling ................ B01J 19/1875
210/219
5,676,889 A * 10/1997 Belgin .................... B01F 27/91
261/93
5,762,833 A * 6/1998 Gross ...................... B01F 27/25
261/93
5,996,977 A * 12/1999 Burgess .................. B01F 27/25
261/93
6,736,377 B1 * 5/2004 Chien ..................... B01F 27/25
261/93
2008/0159061 A1 * 7/2008 Han ........................ B01F 25/64
366/102
2010/0207285 A1 * 8/2010 Tanaka .................... B01F 27/25
261/84
2013/0140246 A1 * 6/2013 Fabiyi ................. B01F 27/1143
261/36.1
2019/0118148 A1 * 4/2019 Mercado Alvarado ......................
B01F 27/25

* cited by examiner

LIQUID POLYMER DOSING AND MIXING CHAMBER AND PUMP

CROSS-REFERENCE TO RELATED APPLICATION

This application is a continuation-in-part of, and claims the benefit of priority to, U.S. patent application Ser. No. 17/577,224, entitled "Automatic Self-Cleaning Filter Driven by Submersible Actuator" incorporated by reference in its entirety herein, which in turn is a continuation-in-part of, and claims the benefit of priority to, U.S. patent application Ser. No. 17/471,546, entitled "Substance Separator System driven by a Submersible Actuator", incorporated by reference in its entirety herein, which in turn is a continuation-in-part of U.S. patent application Ser. No. 17/164,367, filed on Feb. 1, 2021, entitled "Liquid Polymer or Chemical Activation System Using a Submersible Actuator", incorporated by reference in its entirety herein, which in turn is a continuation-in-part of U.S. patent application Ser. No. 16/906,882, filed on Jun. 16, 2020, entitled "Liquid Polymer or Chemical Activation System Using a Submersible Actuator", and incorporated by reference in its entirety herein, which in turn is a continuation-in-part of U.S. patent application Ser. No. 15/787,758, filed on Oct. 19, 2017, entitled "Liquid Polymer Activation System Using a Submersible Actuator" the contents of which are hereby incorporated by reference.

STATEMENT REGARDING FEDERALLY SPONSORED RESEARCH AND DEVELOPMENT

N/A

BACKGROUND OF THE INVENTION

Field of the Invention

The present invention relates to polymer dosing and mixing chamber & pump.

Discussion of the Background

Generally, mechanical blending systems are used in the separation of liquids from solids (and vice versa) on water treatment plants, waste-water treatment plants, pharmaceutical plants, food and beverage plants, diary, distillery, power plants, industrial plants, and mining processing facilities.

Standard mechanical and non-mechanical polymer blending systems use a single energy reaction chamber for dilution and activation of polymer. All of them depend on high inlet water pressure to get or maintain a constant blend if the inlet pressure is low; then the constant blend turns into variable blend. In variable blend systems the operator will follow two things that will increase consumption costs:

Increase polymer dosing pump capacity.

Decrease production to maintain process stability.

Many of the components in blending systems need to be replaced as time goes by. Replacing parts can be difficult or take time when an operator does not have view of the malfunctioning components within the system. It would be desirable to have a polymer dosing and mixing chamber & pump that provides the user operating the mixing device a view of the interior of the chamber. Also, given that the stator is the most frequently replaced component in the field; it would also be desirable to have a stator that is easy to replace and whose replacement is not time-consuming.

SUMMARY OF THE INVENTION

The subject disclosure relates to a liquid polymer dosing and mixing chamber, comprising a hollow chamber, a blending reactor, and a pump housing; wherein the hollow chamber includes a top portion, a body, and a bottom portion, and wherein the body of the hollow chamber is flanked between the top portion and the bottom portion; wherein the top portion of the hollow chamber includes at least one outlet configured to release one or more substances that have been mixed in the blending reactor; a mixing cup, a submersible actuator, and an aging cup within the hollow chamber; wherein the mixing cup comprises an inner wall, an outer wall, and a space located between the inner wall and outer wall, and wherein said space is subdivided into one or more separate sections or compartments; wherein the inner wall of the mixing cup includes one or more openings corresponding to each section or compartment that are configured to receive the one or more substances coming from the blending reactor; wherein each section or compartment of the mixing cup includes one or more jagged or serrated protrusions configured to mix the one or more substances coming from the one or more openings, and a plurality of openings configured to lead the substances into the aging cup; wherein the inner wall of the mixing cup comprises a threaded surface adapted to receive or interact with an NPT male connector from the blending reactor; wherein the mixing cup includes an opening configured to provide access to the shaft extension; wherein the aging cup comprises a bottom section, an upper section, an interior section, and an exterior wall, said bottom section being configured to be coupled with the mixing cup via a first group of one or more screws or fasteners; wherein the bottom section and upper section of the aging cup are flush with each other and between them include an indented or recessed portion that is configured to form a surface on the bottom section of the aging cup having one or more openings that are adapted to receive the substances from the openings in the mixing cup and to direct them, via the exterior wall, towards the upper section of the aging cup; wherein the upper section comprises one or more openings or windows configured to lead the substances from the exterior wall into the interior section of the aging cup, which leads the substances towards the outlet; wherein the mixing cup is configured to serve as a support base for the submersible actuator and the interior section of the aging cup is also configured to fit the submersible actuator; wherein the submersible actuator includes a flange with one or more holes configured to receive the first group of one or more screws or fasteners coupling the aging cup to the mixing cup; a shaft extension having a first end and second end; wherein the submersible actuator is connected to the first end of the shaft extension via a first shaft coupling unit; wherein shaft extension comprises one or more impellers that are adapted to mix the one or more substances in the blending reactor during operation of the liquid polymer dosing and mixing chamber; wherein the blending reactor comprises a hollow tube having a body, a first end, and a second end, wherein each end opposite to each other, and wherein the hollow tube comprises one or more inlets perpendicularly attached to the body; wherein the one or more inlets perpendicularly attached to the body are each configured to receive the one or more substances to be mixed inside the blending reactor by the one or more impellers; wherein the first end includes an NPT male connector that is adapted to interact with the threaded surface on the mixing cup; wherein, the liquid polymer dosing and mixing chamber further comprises a flange having an opening that is also configured to interact with the NPT connector on the first end of the blending reactor; wherein the flange includes one or more holes configured to receive a second group of one or more bolts or fasteners for attaching the flange to the bottom portion of the hollow chamber; wherein the second end of the blending reactor includes an NPT male connector that is adapted to interact with a top flange connected to the supporting top of the pump housing; wherein the NPT male connector in the blending reactor is adapted to interact with a threaded opening in the top flange, which allows the second end to be screwed into the top flange of the pump housing; wherein the pump housing comprises at least one inlet, a progressive cavity pump, a progressive cavity pump supporting top (the "PCP supporting top"), and a progressive cavity pump supporting base (the "PCP supporting base"); wherein the progressive cavity pump comprises a rotor and a stator, and wherein the rotor is configured to interact and fit inside the stator; wherein both the PCP supporting top and the PCP supporting base include an internal opening or chamber, respectively, in which each opening is adapted to align with one another and are configured to hold and enclose the progressive cavity pump in place; wherein the supporting base and the supporting top are both secured to the second blending reactor flange via a third group of one or more bolts, screws, or fasteners; wherein one end of the rotor is adapted to couple with a second end of the shaft extension via a second shaft coupling unit; wherein the PCP supporting top and the PCP supporting base are secured to each other via the third group one or more bolts, screws, or fasteners; and wherein rotation of the rotor in the progressive cavity pump creates a vacuum that pulls a first substance from the inlet towards the blending reactor for mixing with the one or more substances introduced via the one or more inlets perpendicularly attached to the body.

DETAILED DESCRIPTION OF THE INVENTION

Figure 1:
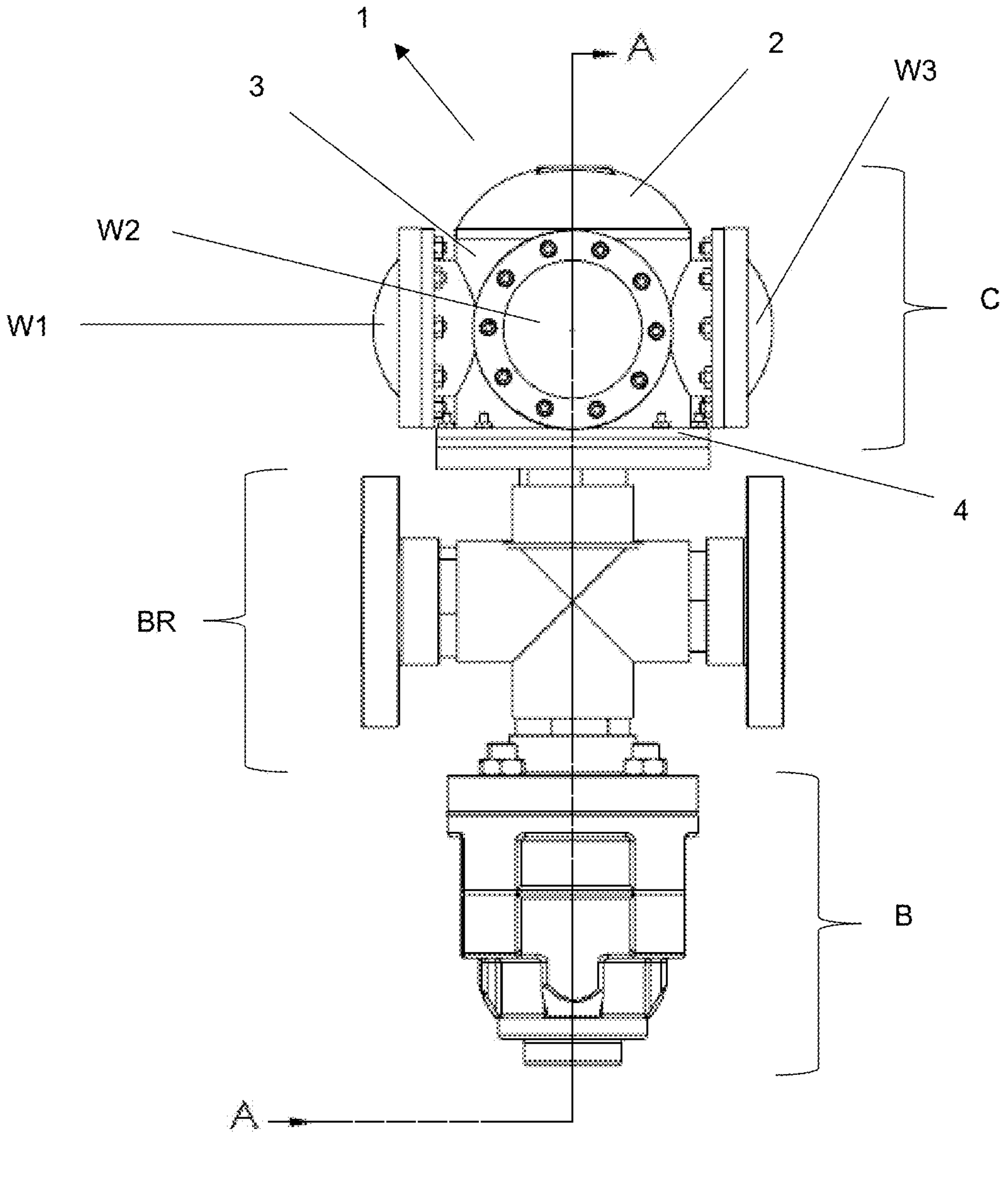
FIG. 1 shows a front view of a liquid polymer dosing and mixing chamber that is driven by a submersible actuator, in accordance with the principles of the present invention.

The present disclosure discloses several exemplary embodiments of a liquid polymer dosing and mixing chamber that is driven by a submersible motor or actuator as well as a dosing pump that incorporates components from the liquid polymer dosing and mixing chamber, as further described below.

FIGS. 1-20 show a liquid polymer dosing and mixing chamber 1 comprising a hollow chamber C, a blending reactor BR, and a pump housing B. The hollow chamber C includes a top portion 2, a body 3, and a bottom portion 4, wherein the body 3 is flanked or located between the top portion 2 and the bottom portion 4. It should be noted that the body 3 of the hollow chamber C may include one or more windows W1-W3 configured to provide a view of the interior of the chamber C; and that the top portion 2 includes at least one outlet O configured to release the substances that have been mixed in the blending reactor BR. In one embodiment, the top area 3 is domed-shaped and the windows W1-W3 are attached or connected to the body 3 of the chamber C, via one or more bolts, screws, or fasteners, as shown in FIGS. 1-5, 11, and 17A-18C.

Figure 6A:
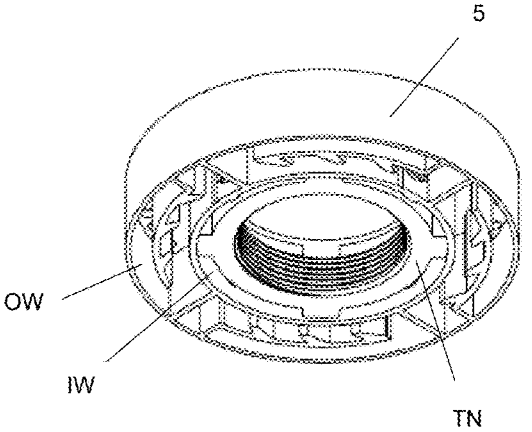
FIGS. 6A-E show the mixing cup component of the liquid polymer dosing and mixing chamber, in accordance with the principles of the present invention.
Figure 6B:
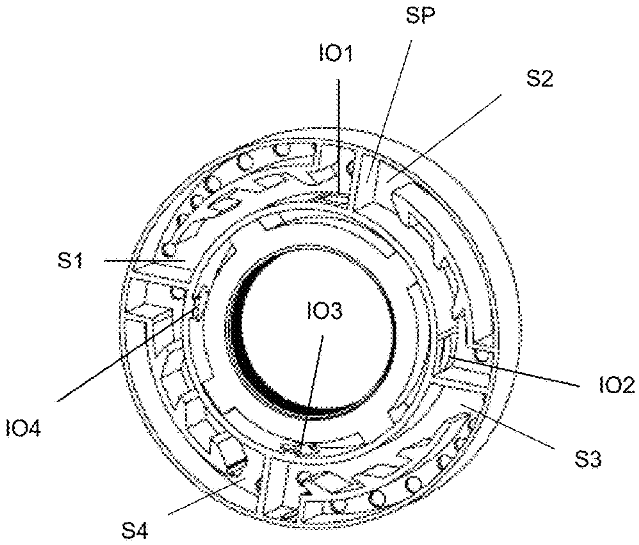
Figure 6C:
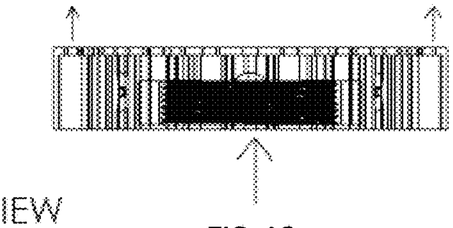
Figure 6D:
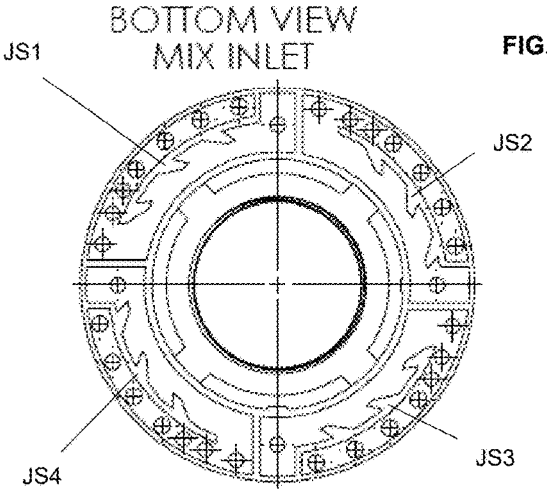
Figure 6E:
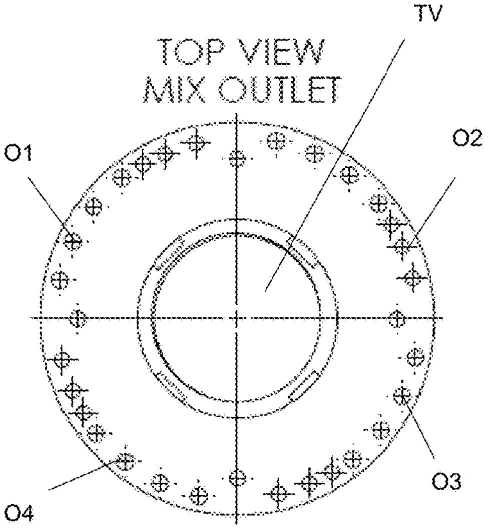
Figure 7A:
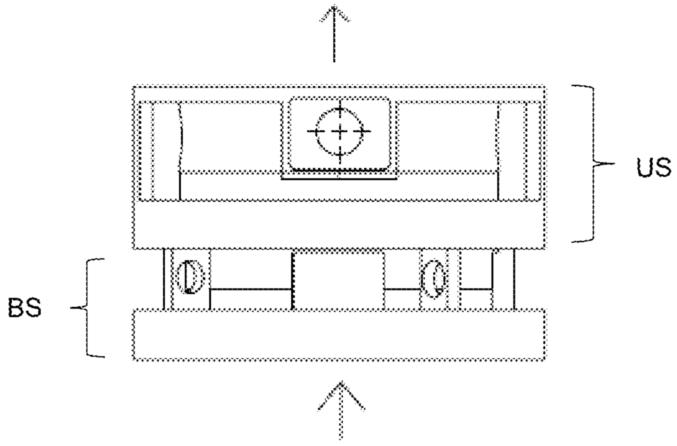
FIGS. 7A-D show the aging cup component of the liquid polymer dosing and mixing chamber, in accordance with the principles of the present invention.
Figure 7B:
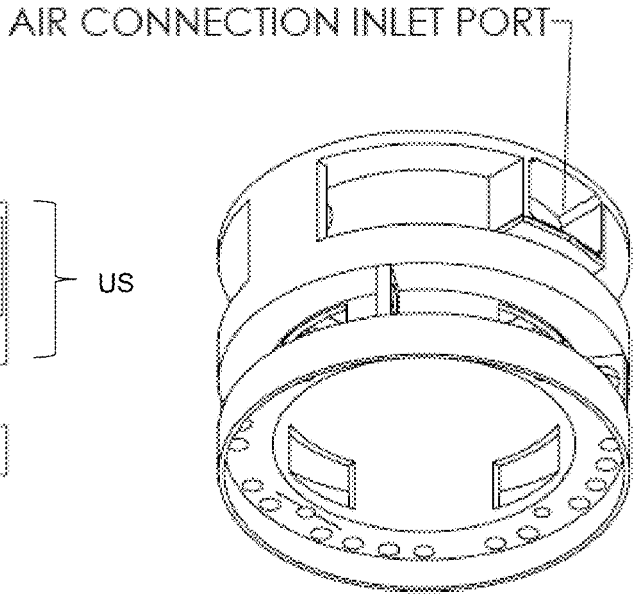
Figure 7C:
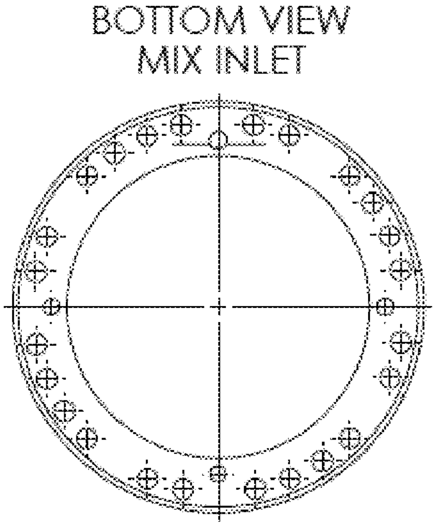
Figure 7D:
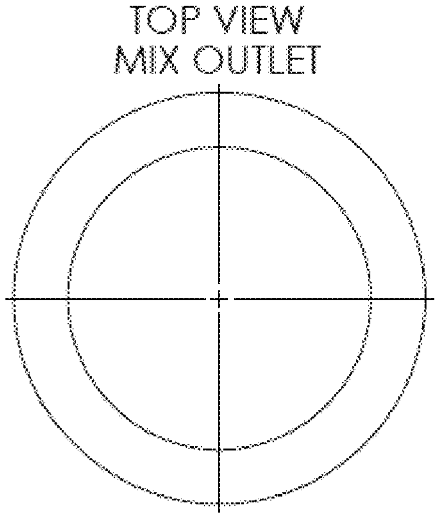
Figure 8:
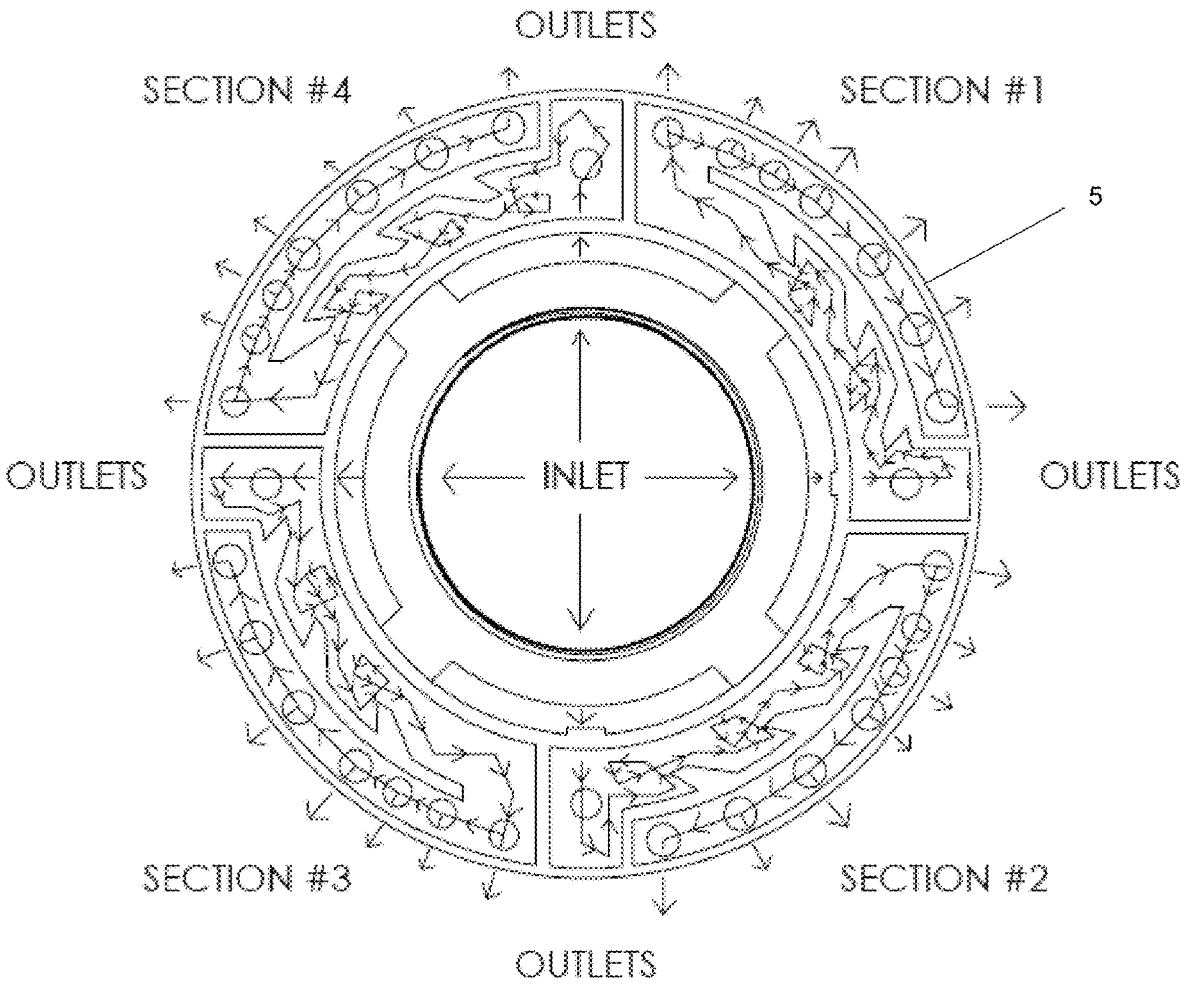
FIG. 8 shows the liquid polymer flow within the mixing cup of the liquid polymer dosing and mixing chamber, in accordance with the principles of the present invention.
Figure 9:
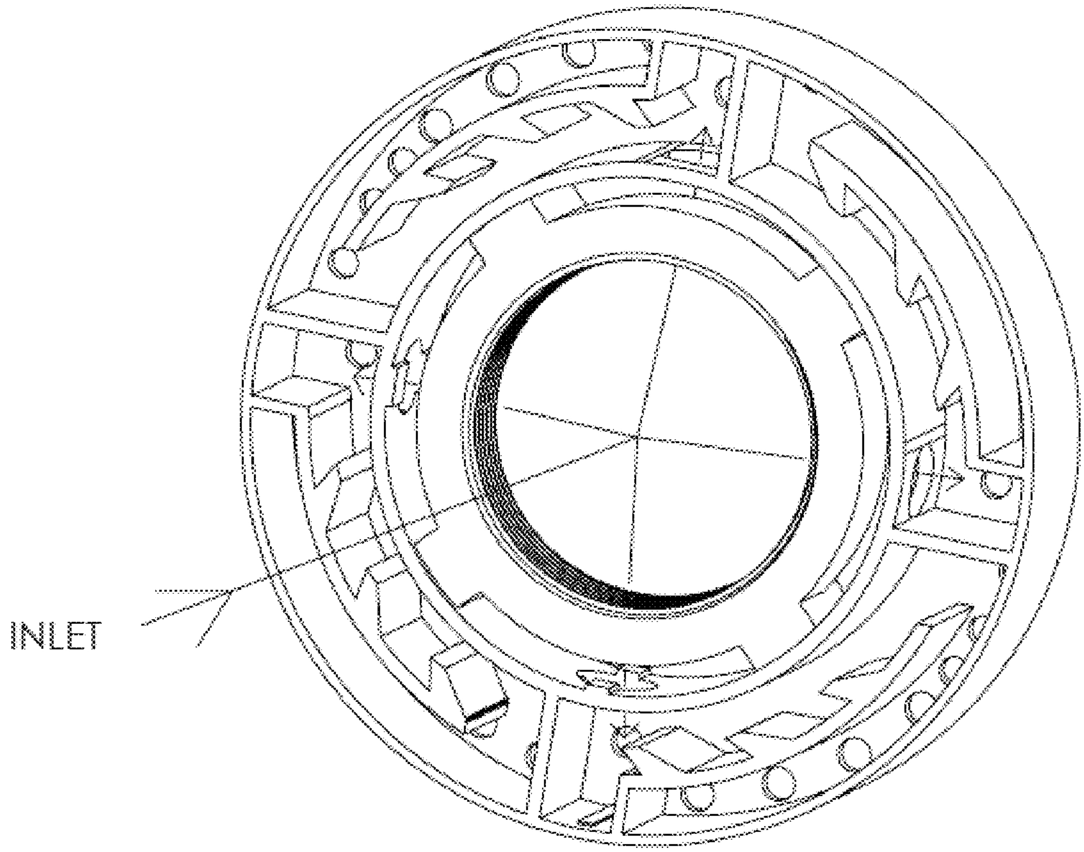
FIG. 9 shows a perspective view of the mixing cup of the liquid polymer dosing and mixing chamber, in accordance with the principles of the present invention.

Within the hollow chamber C, the liquid polymer dosing and mixing chamber 1 comprises a mixing cup 5, a submersible actuator 6, and an aging cup 7. As shown in FIGS. 6A-6E, the mixing cup 5, comprises a ring-shaped structure having an inner wall 1W, an outer wall OW, and a space SP located between the inner wall 1W and outer wall OW, wherein said space is subdivided into one or more separate sections or compartments S1-S4. It should be noted that the inner wall 1W includes one or more openings IO1-IO4 corresponding to each section or compartment S1-S4 that are configured to receive the one or more substances coming from the blending reactor BR. As shown in FIGS. 6A-6E, 8, and 9, each section or compartment S1-S4, in turn, includes: 1) one or more jagged or serrated protrusions JS1-JS4 configured to mix the one or more substances coming from the one or more openings IO1-IO4; and 2) a plurality of openings O1-O4 configured to lead the substances into the aging cup 7, thereby serving as outlets into the aging cup. The flow of the substances within the mixing cup is shown in FIGS. 8 and 9, where it can be appreciated that the substances flow through openings IO1-IO4 in each section S1-S4; mix as they collide with serrated structure JS1-JS4; and exit the mixing cup 5 via the plurality openings O1-O4. The mixing cup 5 is also configured to serve as a support base for the submersible actuator 6. To that end, the submersible actuator 6 includes a flange FL with one or more holes configured to receive a screw or fastener F1, F2, as shown on FIG. 4, thereby allowing the actuator 6 to be tightly secured to the mixing cup 5. Moreover, the inner wall 1W of the mixing cup 5 comprises a threaded surface TN adapted to receive or interact with an NPT male connector 8 from the blending reactor BR. The threaded surface TN may be integrated to the inner wall 1W; or attached, connected or welded thereto (to the inner wall) via a threaded nut-like structure, as shown in FIG. 6A. The mixing cup 5 further includes an opening TV at its center (i.e., the center of the ring-shaped structure) configured to provide access to the shaft extension SE, as further described below, and as shown in FIGS. 6D-6E. It should be noted that while the preferred embodiment of the mixing cup 5 is ring-shaped, it may nonetheless have other shapes.

Figure 10:
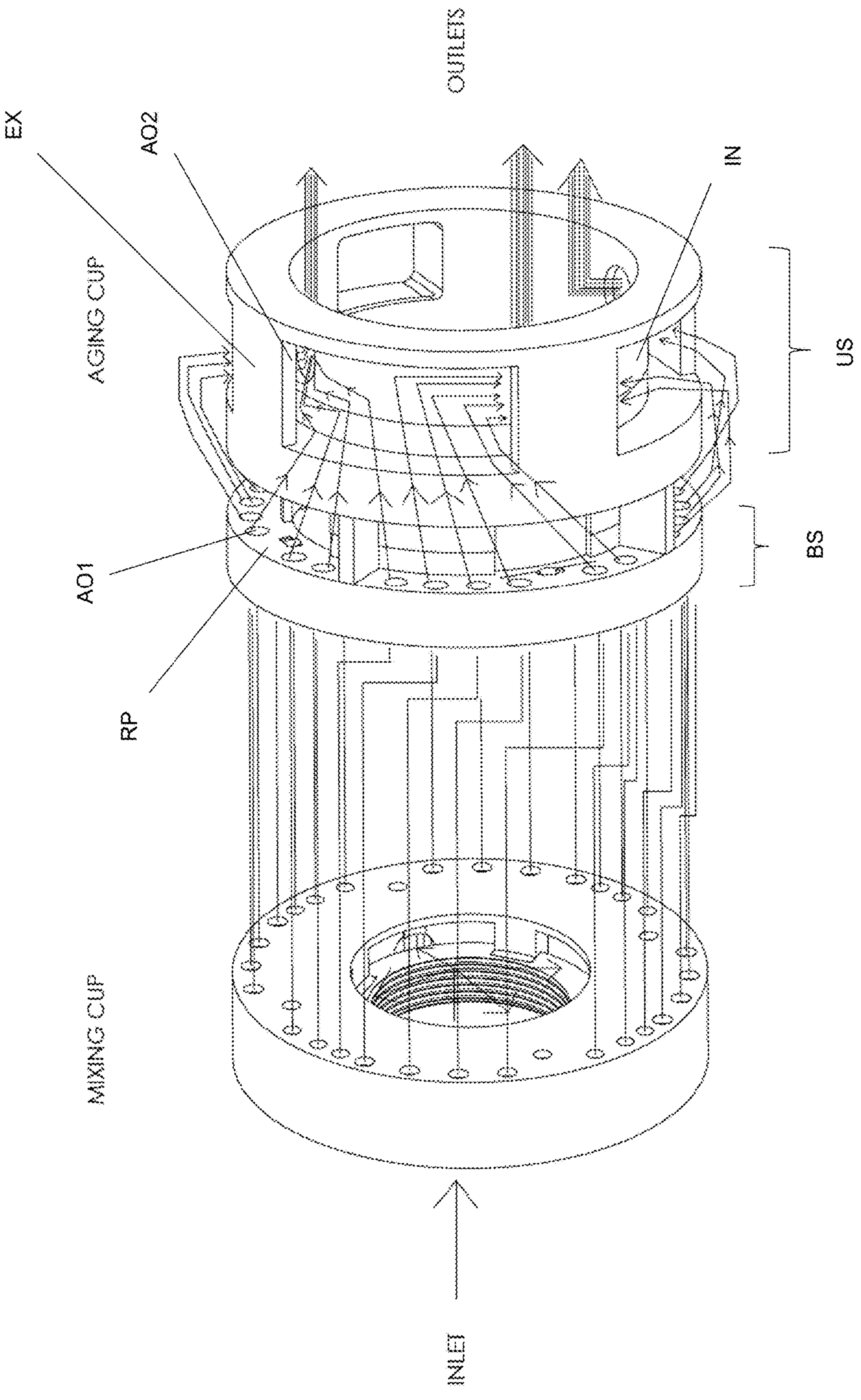
FIG. 10 shows the flow of the liquid polymer along the mixing cup and aging cup of the liquid polymer dosing and mixing chamber, in accordance with the principles of the present invention.
Figure 11:
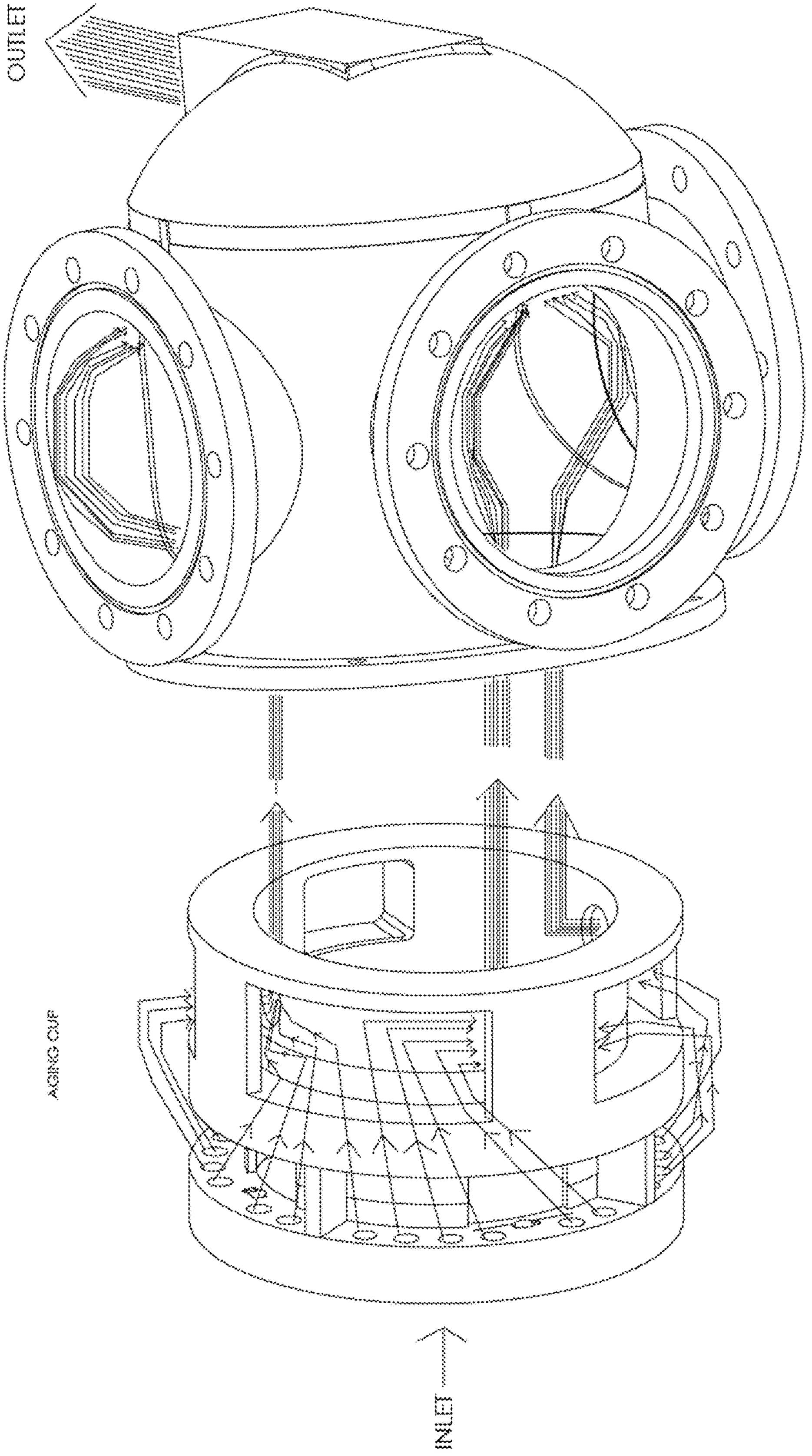
FIG. 11 shows the flow of the liquid polymer along the mixing cup, aging cup, and hollow chamber of the liquid polymer dosing and mixing chamber, in accordance with the principles of the present invention.

As shown in FIGS. 7A-7D, 10 and 11, the aging cup 7, comprises a ring-shaped structure having a bottom section BS, an upper section US, an interior section IN, and an exterior wall EX. The bottom section BS serves as a support base for the aging cup 7 and is configured to be coupled with the mixing cup 6 via the one or more screws, or fasteners F1, F2, which are the same fasteners used to fasten the submersible actuator 6 to the mixing cup 5, as shown on FIG. 4. The bottom section BS and upper section US of the aging cup 7 are flush or leveled with each other and between them include an indented or recessed portion RP configured to form a surface on the bottom section BS having one or more openings AO1, which are adapted to receive the substances from the openings O1-O4 in the mixing cup 6 and to direct them, via the exterior wall EX, towards the upper section US, as shown in FIG. 10. The upper section US, in turn, comprises one or more openings or windows AO2 configured to lead the one or more substances from the exterior wall into the interior section IN of the aging cup 7, which in turn, leads the mixed substances towards the outlet O, where the mixed substances are released from the liquid polymer dosing and mixing chamber 1, as shown in FIGS. 10 and 11.

Figure 4:
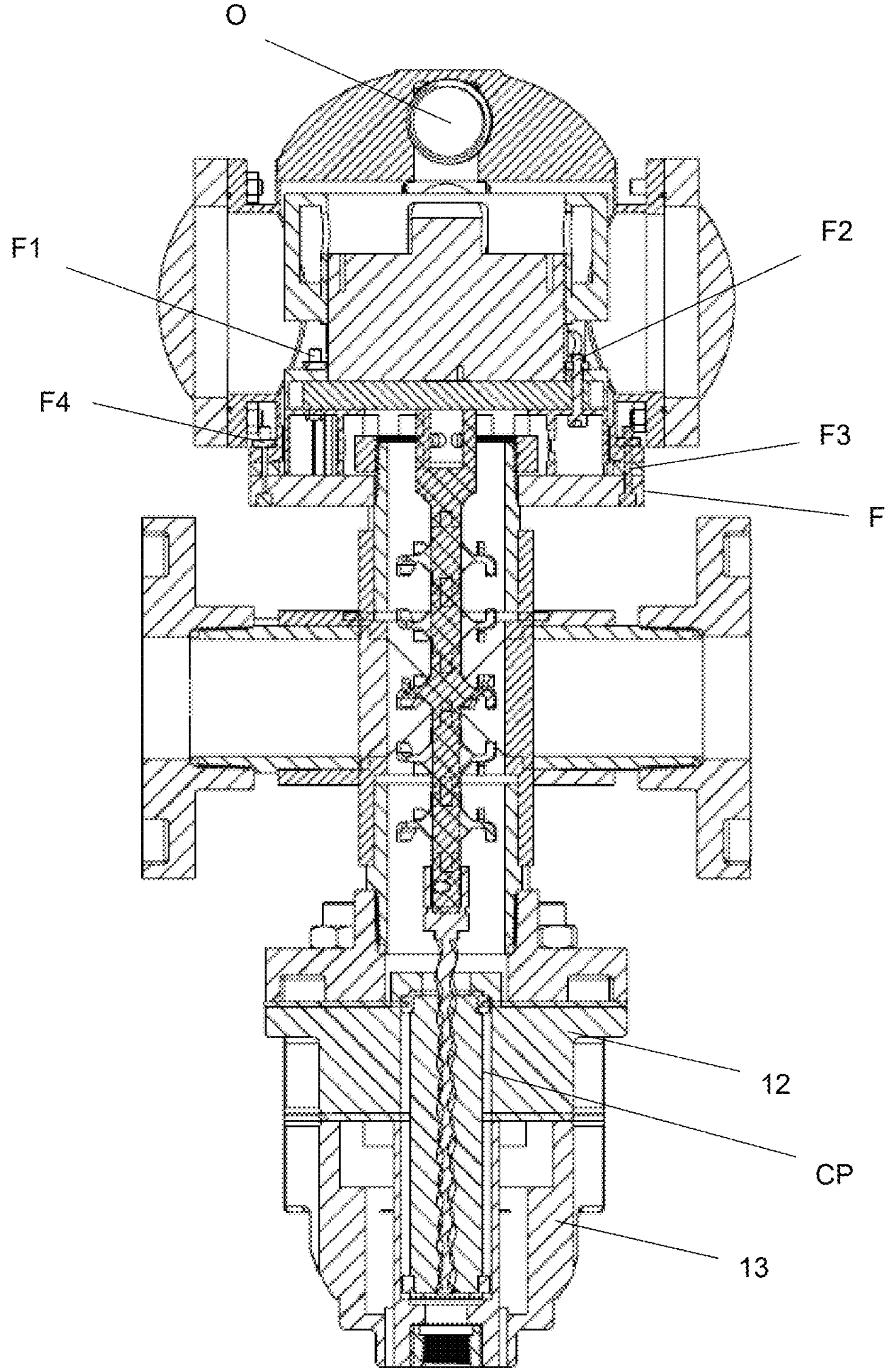
FIG. 4 is a sectional view of the liquid polymer dosing and mixing chamber taken along line F-F in FIG. 3.
Figure 5:
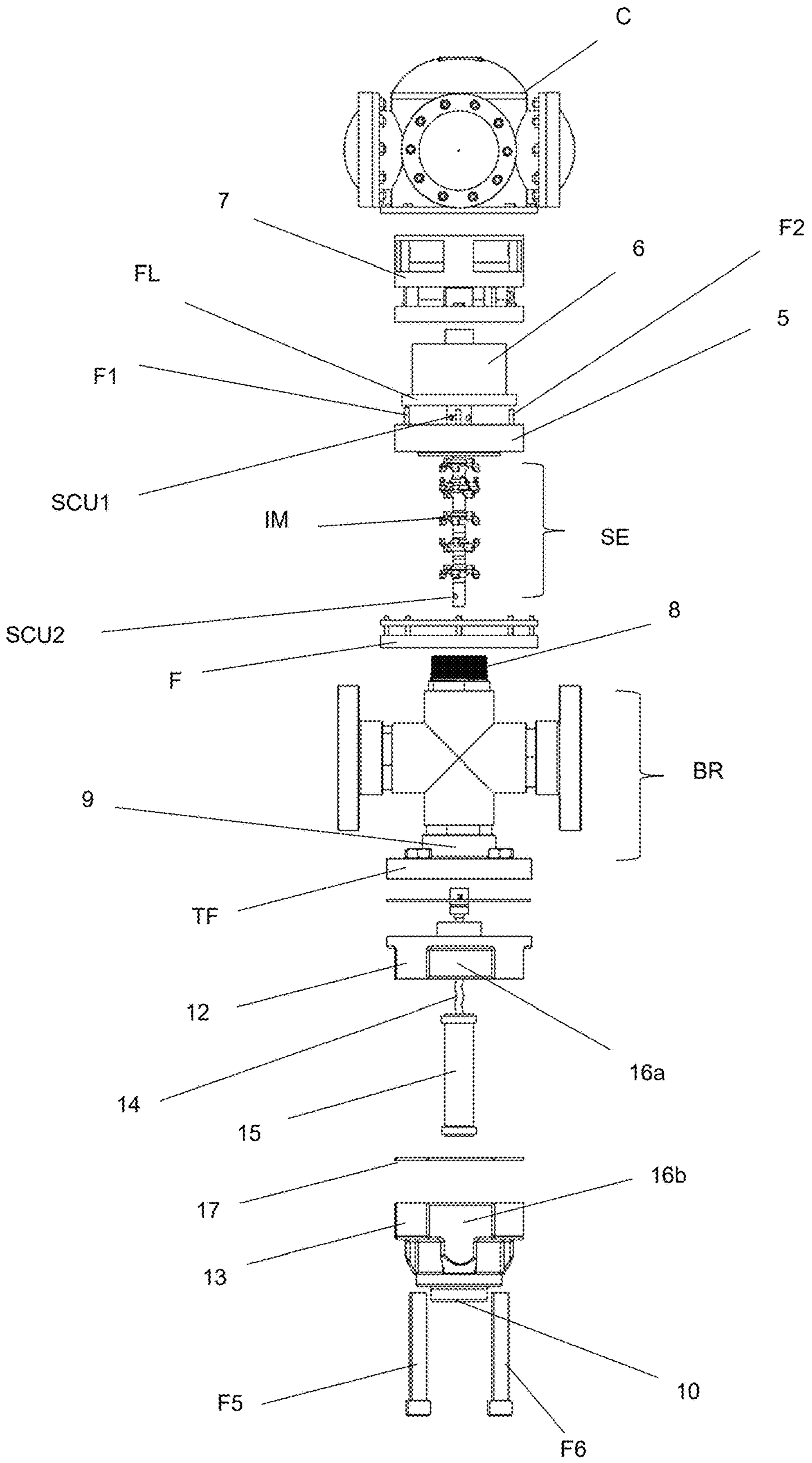
FIG. 5 shows an exploded view of the interior components of the liquid polymer dosing and mixing chamber, in accordance with the principles of the present invention.

The interior section IN of the aging cup 7 is also configured to fit the submersible actuator 6 as shown in FIG. 4. To that end, the upper section US includes a connection inlet port IP configured to provide access to the cables that power the pneumatic version of the submersible actuator 6.

As previously noted, the submersible actuator 6 is securely fixed to the mixing cup 5 via one or more screws or fasteners F1, F2. Additionally, the submersible actuator 6 is connected to a first end of a shaft extension SE via a first shaft coupling unit SCU1. The shaft extension SE, in turn, comprises one or more impellers IM that are adapted to mix the one or more substances in the blending reactor BR during operation of the liquid polymer dosing and mixing chamber 1. The submersible actuator 6 is responsible for actuating the rotation of the shaft extension SE and consequently the rotation of the one or more impellers IM during operation of the liquid polymer dosing and mixing chamber 1. It should be noted that the submersible actuator 6 may be a submersible electric motor or actuator; a submersible hydraulic motor; or preferably a pneumatic motor.

The blending reactor BR, in turn, comprises a hollow tube T having a body, a first end E1 and a second end E2, wherein each end opposite to each other, and wherein the hollow tube T comprises one or more inlets IN1-IN4 perpendicularly attached to the body of the hollow tube T. The one or more inlets IN1-IN4, are each configured to receive one or more substances to be mixed inside the blending reactor by the one or more impellers IM. It should be noted that the first end E1 includes an NPT male connector 8 that is adapted to interact with the threaded surface TN on the mixing cup 5. This way, the first end E1 of the blending reactor BR can be screwed into the mixing cup 5. Moreover, the liquid polymer dosing and mixing chamber 1 comprises a flange F having an opening that is also configured to interact with the NPT connector 8 on the first end E1 of the blending reactor BR. As shown in FIG. 4, the flange F also includes one or more holes configured to receive one or more bolts, screws, or fasteners F3, F4 for attaching the flange F to the bottom portion of the hollow chamber C, thereby allowing the chamber C to be tightly secured to the blending reactor BR. As such, the flange F is adapted to act as the base of the hollow chamber C. The second end E2 of the blending reactor BR, in turn, also includes an NPT male connector 9 that is adapted to interact with a top flange TF connected to the supporting top 12 of the pump housing B. Particularly, the NPT male connector 9 is adapted to interact with a threaded opening in the top flange TF, which allows the second end SE to be screwed into the top flange TF of the pump housing B. The remaining inlets IN3-IN4 may also comprise an NPT male connector adapted to interact with other parts having threaded openings or NPT female connectors, such as flanges, etc.

Figure 2:
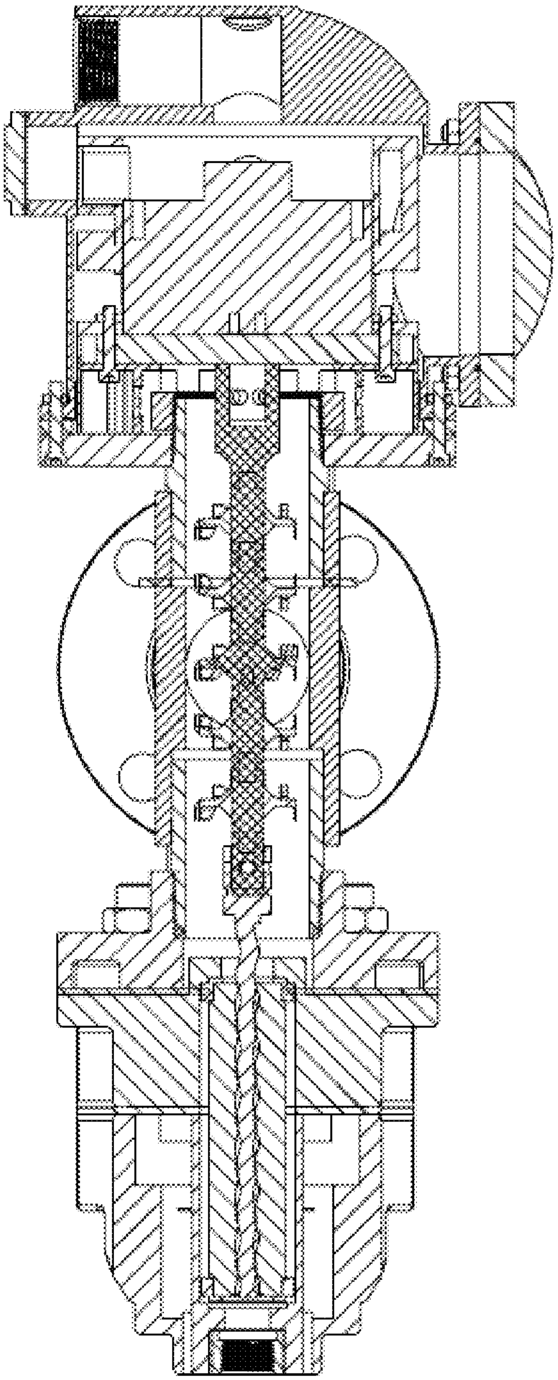
FIG. 2 is a sectional view of the liquid polymer dosing and mixing chamber taken along line A-A in FIG. 1, in accordance with the principles of the present invention.
Figure 3:
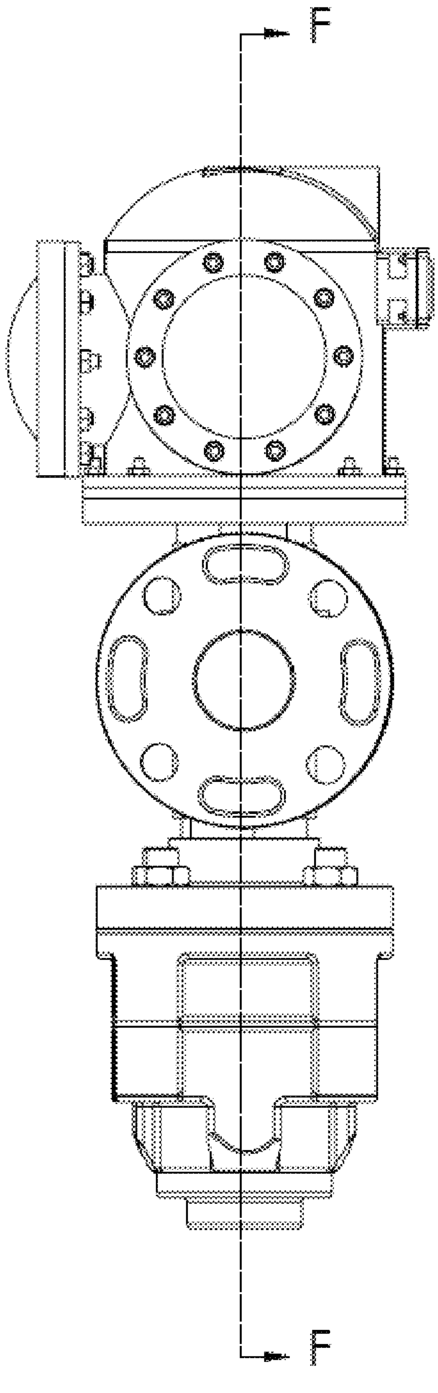
FIG. 3 shows a side view of the liquid polymer dosing and mixing chamber, in accordance with the principles of the present invention.
Figure 12:
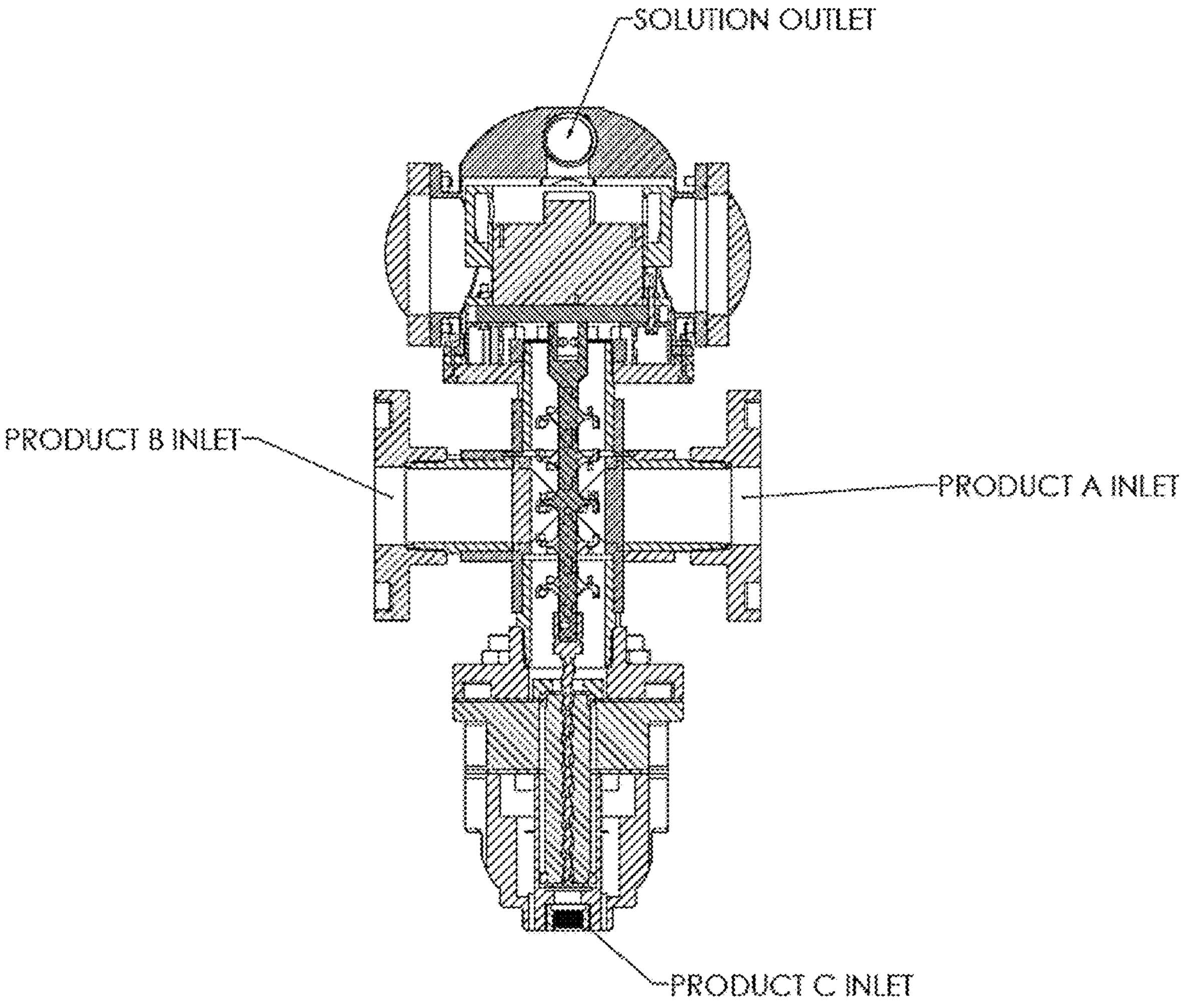
FIG. 12 shows a sectional view of the liquid polymer dosing and mixing chamber, in accordance with the principles of the present invention.
Figure 13:
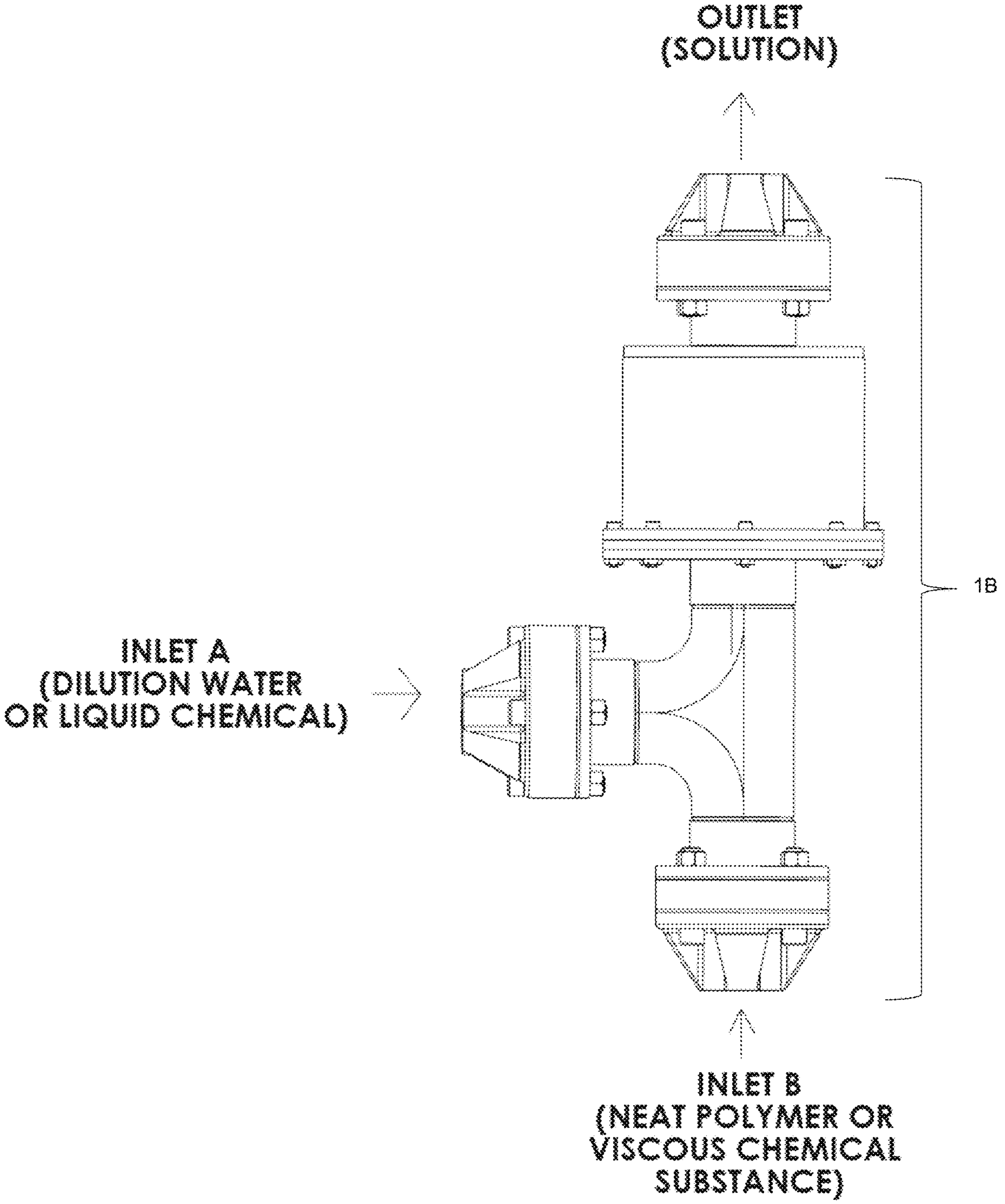
FIG. 13 shows a liquid polymer dosing and mixing pump, in accordance with the principles of the present invention.

The pump housing B, on the other hand, comprises at least one inlet 10, a progressive cavity pump CP, a progressive cavity pump supporting top 12 (the "PCP supporting top"), and a progressive cavity pump supporting base 13 (the "PCP supporting base"); wherein the progressive cavity pump CP comprises a rotor 14 and a stator 15, wherein the rotor is configured to interact and to fit inside the stator; and wherein the progressive cavity pump CP is enclosed within the PCP supporting top 12 and PCP supporting base 13. Such enclosure is possible because both the PCP supporting top 12 and the PCP supporting base 13 include an internal opening or chamber 16A, 16B, respectively, in which the openings 16A, 16B are adapted to align with one another and are configured to support and/or hold the progressive cavity pump CP tightly in place, as shown in FIGS. 2, 4, 12. As such, the PCP supporting top 12 and PCP supporting base 13 act as a housing for the progressive cavity pump CP. It should be noted that the rotor 14 is actuated or rotated via the submersible actuator 6. Such rotation is possible because one end of the rotor 14 is adapted to couple with a second end of the shaft extension SE via a second shaft coupling unit SCU2. With respect to the progressive cavity pump, the basic working principle of operation is a rotor (usually made of solid metal) shaped as a single helix rotating inside a stator (usually made of an elastomer) that has a double helix cavity. The rotation of the rotor 14 in the progressive cavity pump CP creates a vacuum that pulls a first substance from the inlet 10 towards the blending reactor BR. As the first substance passes along the progressive cavity pump CP, the rotor 14 creates doses of the first substance before it (i.e., the first substance) reaches the blending reactor BR. It should be noted that the rotor 14 is a spiral stainless steel shaft that can be fabricated in any type of steel or high strength plastics. The rotor creates conveying spaces in the inner part of the stator. Stators use metal pipes, or metal tubes with internally molded cavities made of the following synthetic or rubber materials: NBR, EPDM black, EPDM white, FKM, VITON, HBNR, PTFE, NBRH, SBLBM; Buna CB; CSM, HNBR, Silicone, Perbunan®, Nitril®, Viton®, Natural rubber, Teflon®; and new developed 3D printed thermoplastics elastomers materials.

Once in the blending reactor BR, the first substance will be mixed, via rotation of the impellers IM, with the one or more substances being introduced to the blending reactor BR via the one or more inlets IN1-IN4. The mixed substances will then be led into the mixing cup 5, where they will continue to mix as they pass along the serrated structure JS1-JS4 until reaching the aging cup 7, where the mixed substances will be led into the hollow chamber C, before being released from the liquid polymer dosing and mixing chamber 1 via the outlet O.

The pump housing B may also comprise a gasket 17 (preferably made of rubber) between the PCP supporting top 12 and the PCP support base 13 in order to avoid leakage between these two elements. The PCP supporting top 12, the PCP support base 13, and the gasket 17 comprise one or more holes that align with one another and are configured to receive one or more bolts F5, F6. In this manner, the PCP supporting top 12, the PCP support base 13, and the gasket 17, are tightly pressed against each other when secured via the one or more bolts, screws, or fasteners F5, F6.

FIGS. 19A to 21 show an alternate embodiment of the liquid polymer dosing and mixing chamber which has a similar structure to the liquid polymer dosing and mixing chamber 1, expect for the differences set forth herein. In this embodiment, the liquid polymer dosing and mixing chamber 1', comprises a transparent or see through hollow chamber C' adapted to provide a view of the interior of the chamber C', as shown in FIGS. 19A-B, 20A-C, and 21. As with the hollow chamber C, the hollow chamber C' is configured to fit the mixing cup 5, actuator 6, and the aging cup 7 inside the hollow chamber C'. It should be noted that the hollow chamber C' includes a top portion 2', a body 3', and a bottom portion 4', wherein the body 3' is flanked or located between the top portion 2' and the bottom portion 4'. It should be noted that the top portion 2' includes at least one outlet O' configured to release the substances that have been mixed in the blending reactor BR'; and that the bottom portion 4' includes a chamber flange F' having one or more holes that align with the one or more holes of a flange F" on the first end E1' of the blending reactor BR, as further described below. The holes on the chamber flange F' and the flange F" on the blending reactor BR' are configured to receive one or more bolts, screws, or fasteners F3, F4, which allows the chamber C' to be tightly secured to the blending reactor BR'. The body 3' of then chamber C' may also include one or more access points or doors AP configured to provide access to the interior of the chamber C'. The access points AP may be connected to the body via one or more bolts, screws or fasteners F7. The access points AP may also include a connection inlet port IP' configured to provide access to the cables that power the pneumatic version of the submersible actuator 6.

Moreover, the blending reactor BR' in the liquid polymer dosing and mixing chamber 1' comprises a material that is adapted to provide a view of the interior of said reactor. 3-D printing resins like Stratasys Watershed can be used to give the blending reactor BR' a transparent appearance. Like the blending reactor BR, the blending reactor BR' comprises a hollow tube T' having a body, a first end E1' and a second end E2', each end opposite to each other, and one or more inlets IN1'-IN3' perpendicularly attached to the hollow tube T'. The one or more inlets IN1'-IN3', are each configured to receive one or more substances to be mixed inside the blending reactor by the one or more impellers IM. It should be noted that the first end E1' of the blending reactor includes a flange F" and an NPT male connector MC1 that is adapted to interact with the threaded surface TN on the mixing cup 5. The NPT male connector MC1 allows the first end E1' of the blending reactor BR' to be screwed into the mixing cup 5. The second end E2' of the blending reactor BR', in turn, is joined to a threaded nut 19 that is adapted to interact with one end of the progressive cavity pump CP', as further described below. The remaining inlets IN3' may also comprise an NPT male connector adapted to interact with other parts having threaded openings or NPT female connectors, such as flanges, etc.

Figure 21:
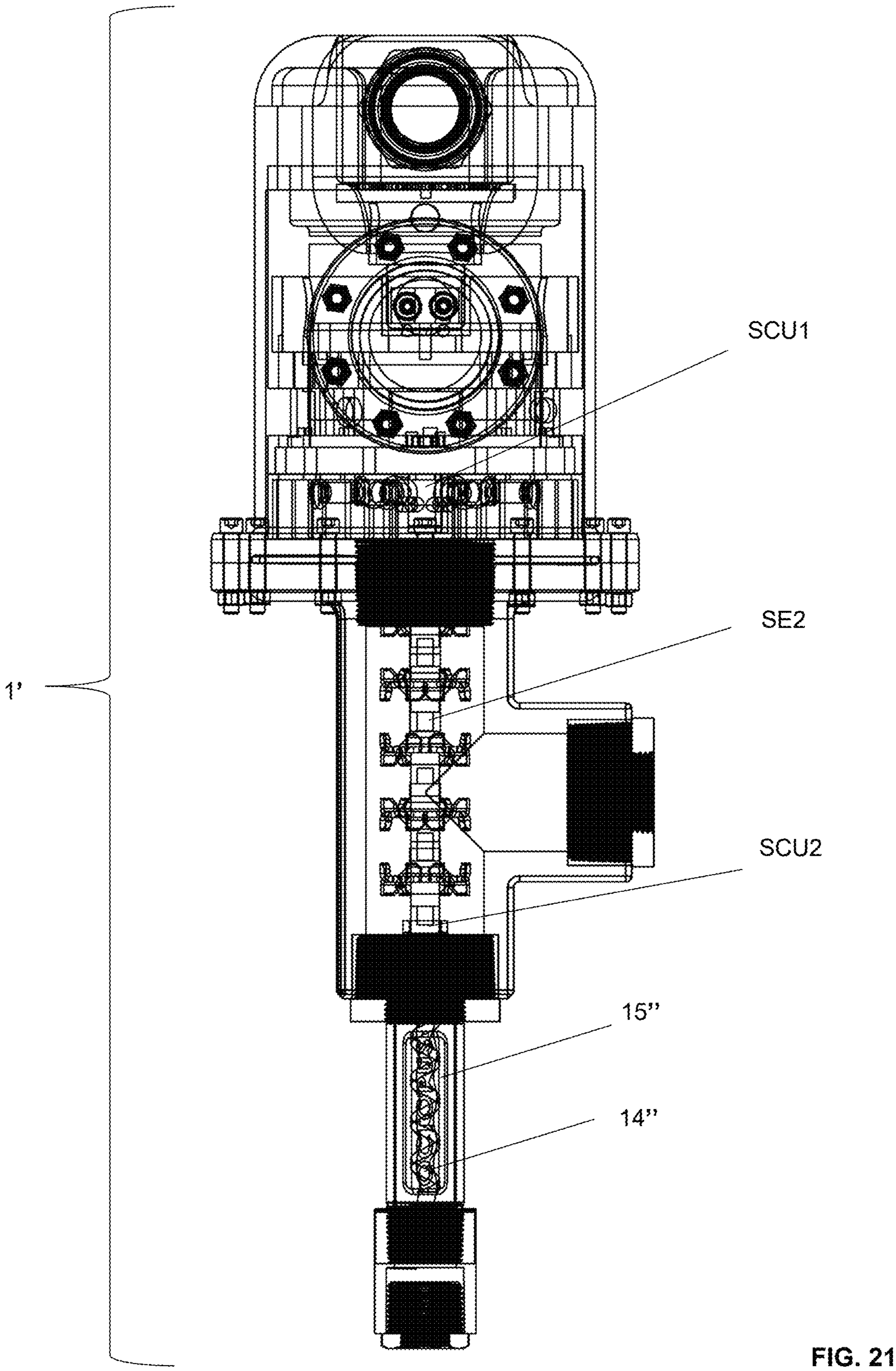
FIG. 21 shows the internal components of the alternate embodiment of the liquid polymer dosing and mixing chamber, in accordance with the principles of the present invention.
Figure 22A:
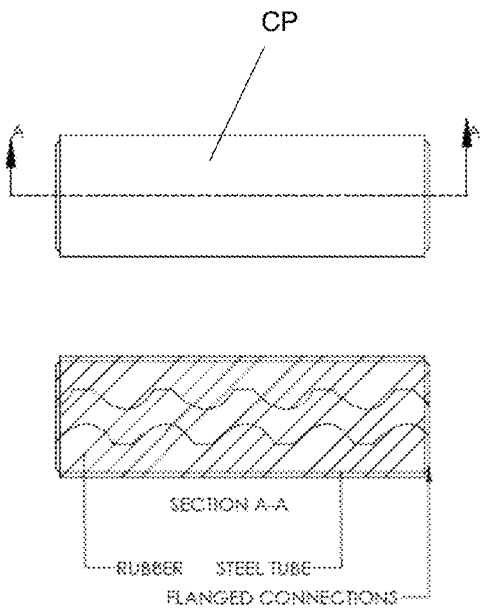
FIGS. 22A-B show cross section views of the two progressive cavity pumps described in the subject disclosure.
Figure 22B:
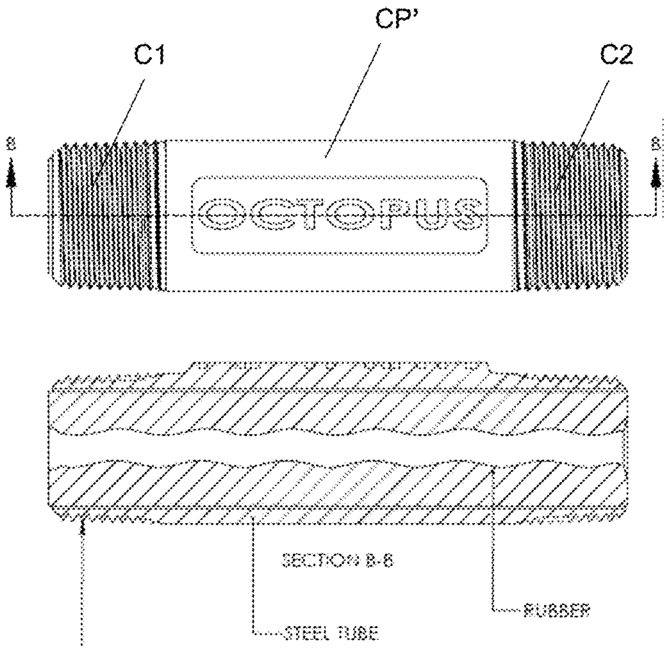

As shown in FIGS. 19A-21, the liquid polymer dosing and mixing chamber 1' also comprises a progressive cavity pump CP' with NPT connectors instead of the pump housing B of the previous embodiment. The progressive cavity pump CP' comprises a rotor 14" and a stator 15", wherein the rotor is configured to interact and to fit inside the stator. The difference between the progressive cavity pump CP (shown in FIG. 22A) and the progressive cavity pump CP' (shown in FIG. 22B) is that the progressive cavity pump CP' includes a first NPT male connector C1 on a first end and a second NPT male connector C2 on a second end, as shown in FIG. 22B. The NPT connectors remove the need for having to enclose the progressive cavity pump CP within the pump housing B, thereby making the liquid polymer dosing and mixing chamber 1 easier to assemble and/or manufacture. The first NPT male connector C1 is adapted to interact with the threaded opening of the nut 19, which allows the first NPT male connector C1 on the first end of the progressive cavity pump CP' to be screwed into the second end E2' of the blending reactor BR'. The second NPT male connector C2 on the other hand is adapted to interact with inlet 20, which serves as an inlet into the progressive cavity pump CP'. As previously noted, the rotation of the rotor in the progressive cavity pump creates a vacuum that pulls a first substance from the inlet 20 towards the blending reactor BR'.

It should further be noted that the liquid polymer dosing and mixing chamber 1', comprises a shaft extension SE2 having a first end and a second end. The first end is connected to the submersible actuator 6 with a shaft coupling unit SCU1 and the second end is adapted to interact with the rotor 14". Specifically, one end of the rotor 14" is adapted to couple with a second end of the shaft extension SE2 via a second coupling unit SCU2, as shown in FIG. 21.

Lastly, it should be noted that the subject disclosure also relates to a dosing and mixing pump 1B, as shown in FIGS. 13-16. The dosing and mixing chamber 1B comprises one or more inlets or nozzles 1131, 1132, at least one outlet or nozzle OB, a blending reactor BR2, a mixing cup 5B, a submersible actuator 6B, an aging cup 7B, and a compartment CB attached or joined to the blending rector BR2 that is configured to house or enclose the mixing cup 5B, the submersible actuator 6B, and the aging cup 7B. The components and structural arrangement of the mixing cup 5B, submersible actuator 6B, and aging cup 7B are the same as the structural arrangement of the mixing cup 5, submersible actuator 6, and aging cup 7 in the liquid polymer dosing and mixing chamber 1 (e.g., the mixing cup includes separate compartments with jagged or serrated protrusions, the aging cup has one or more windows, etc.). Like submersible actuator 6, the submersible actuator 6B is connected to a first end of a shaft extension SE' via a first shaft coupling unit SCU3. The shaft extension SE', in turn, comprises one or more impellers IM2 that are adapted to mix the one or more substances inside the hollow tub UB of the blending reactor BR2 during operation of the dosing and mixing pump 1B. The submersible actuator 6B is responsible for actuating the rotation of the shaft extension SE' and consequently the rotation of the one or more impellers IM2 during operation of the polymer dosing and mixing pump 1B. It should be noted that the submersible actuator 6B, may be an electric motor, a hydraulic motor, or preferably a pneumatic motor. To that end, the compartment CB includes a connection inlet port IP2 configured to provide access to the cables that power the pneumatic version of the submersible actuator 6B.

It should be noted that a top end of the compartment CB includes a tube extension TB1 having a first flange FG1 that is, in turn, configured to be attached or secured to the outlet or nozzle OB via one or more screws, bolts, or fasteners F8, F9. Particularly, the flange FG1 and outlet or nozzle OB both include one or more holes that align with each other and are configured to receive the one or more screws, bolts, or fasteners F8, F9, thereby securing the outlet or nozzle OB to the first flange FG1. A gasket 17' (preferably made of rubber) may be included between the first flange FG1 and outlet or nozzle OB in order to avoid leakage between these two elements. The bottom end of the compartment CB, on the other hand, includes a second flange FG2 having one or more holes configured to receive one or more screws, bolts, or fasteners F10, F11, wherein said one or more screws, bolts, or fasteners are used to secure the second flange FG2 to a first blending reactor flange FG3 on the first end N1 of the blending reactor BR2. The first blending reactor flange FG3 is adapted to serve as a support base for the mixing cup 5B and includes one or more bolts BS1-3 welded thereto to secure the submersible actuator 6B, and aging cup 7B within the compartment CB. Moreover, the first blending reactor flange FG3 includes one or more holes that align with the one or more holes in the second flange FG2 and are configured to receive one or more screws, bolts, or fasteners F10, F11. In this manner, the compartment CB and blending reactor BR2 are tightly secured to each other.

Figure 14:
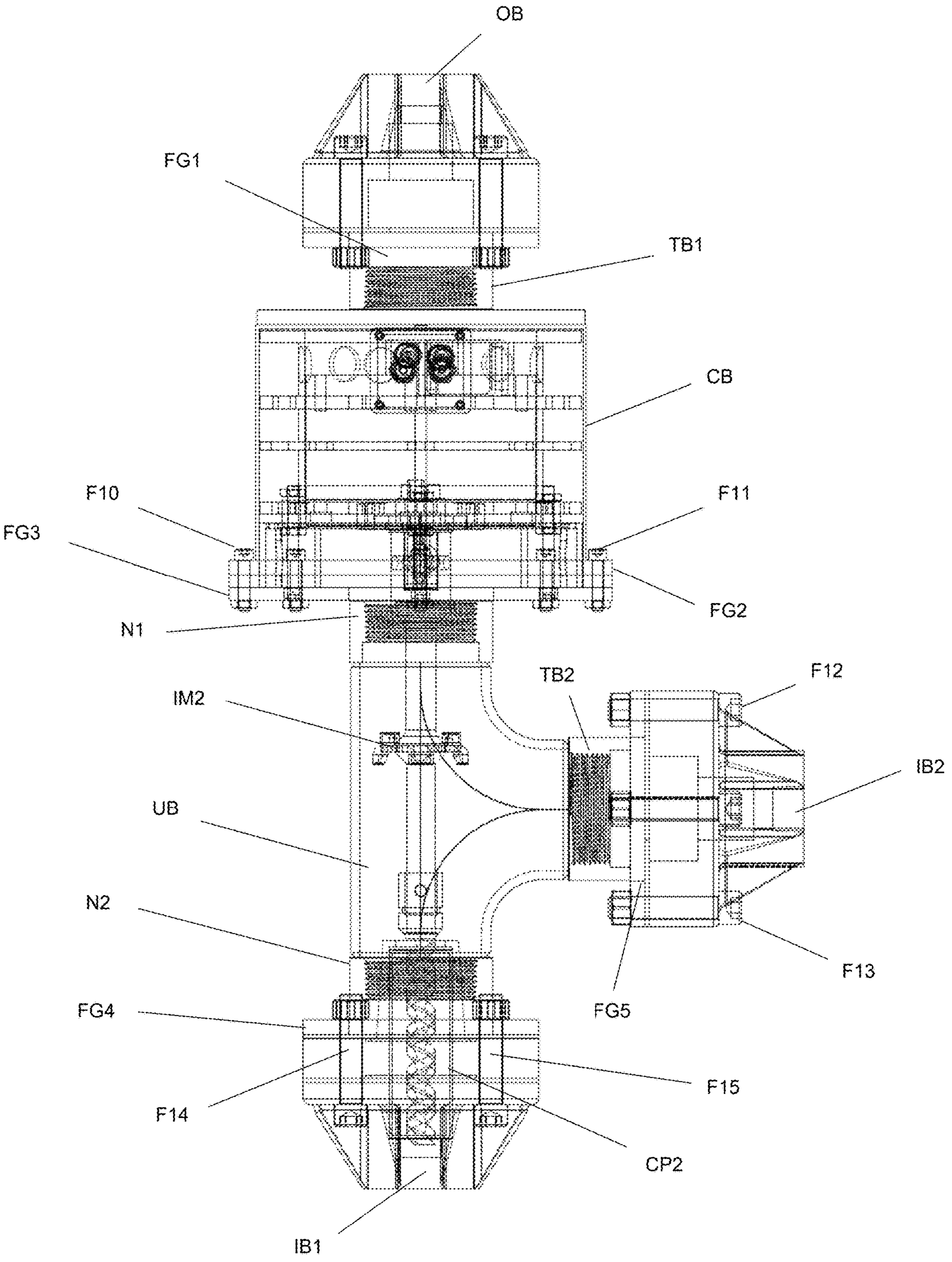
FIG. 14 shows the interior components of the liquid polymer dosing and mixing pump, in accordance with the principles of the present invention.
Figure 15:
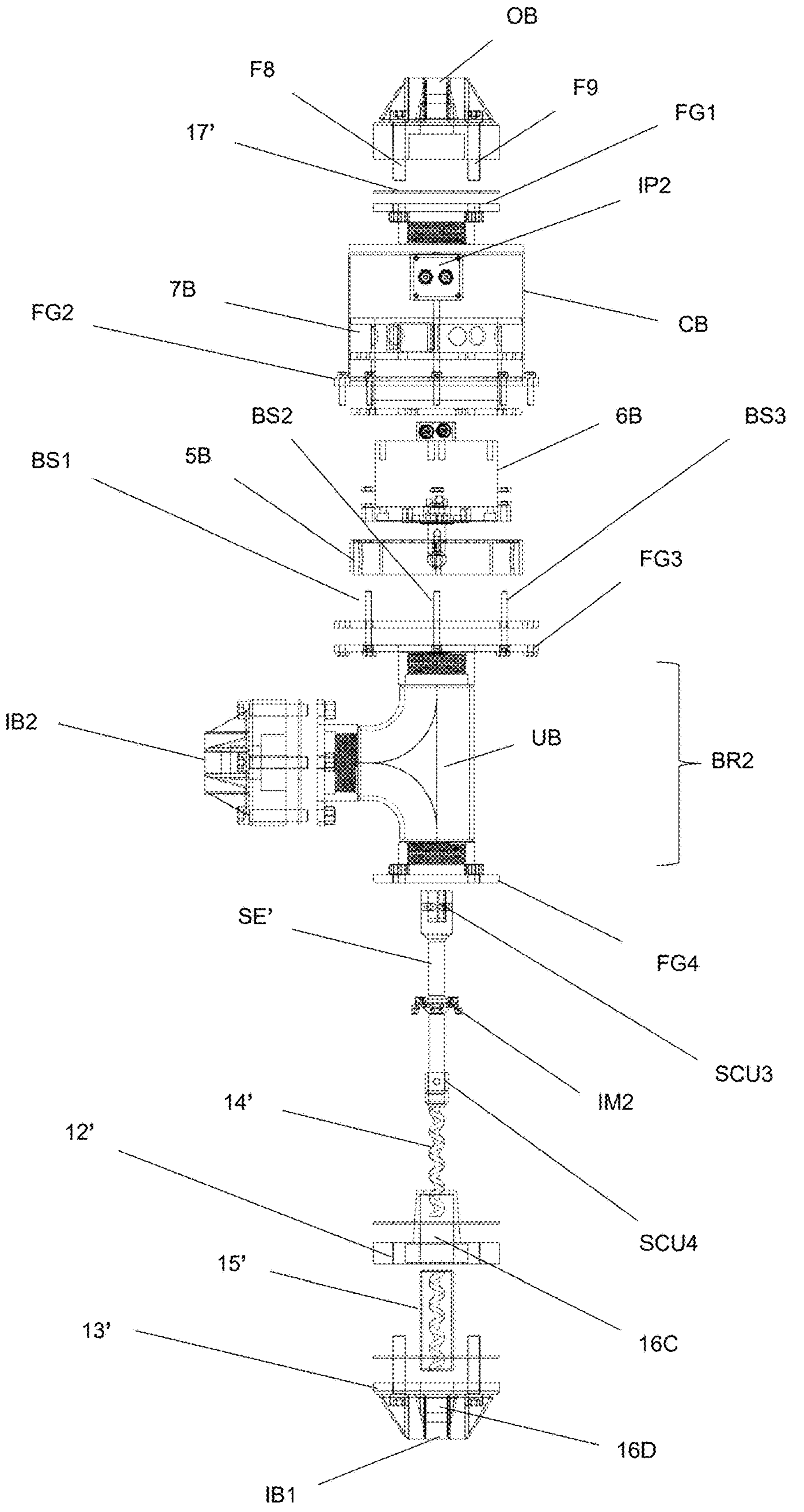
FIG. 15 shows an exploded view of the interior components of the liquid polymer dosing and mixing pump, in accordance with the principles of the present invention.
Figure 16:
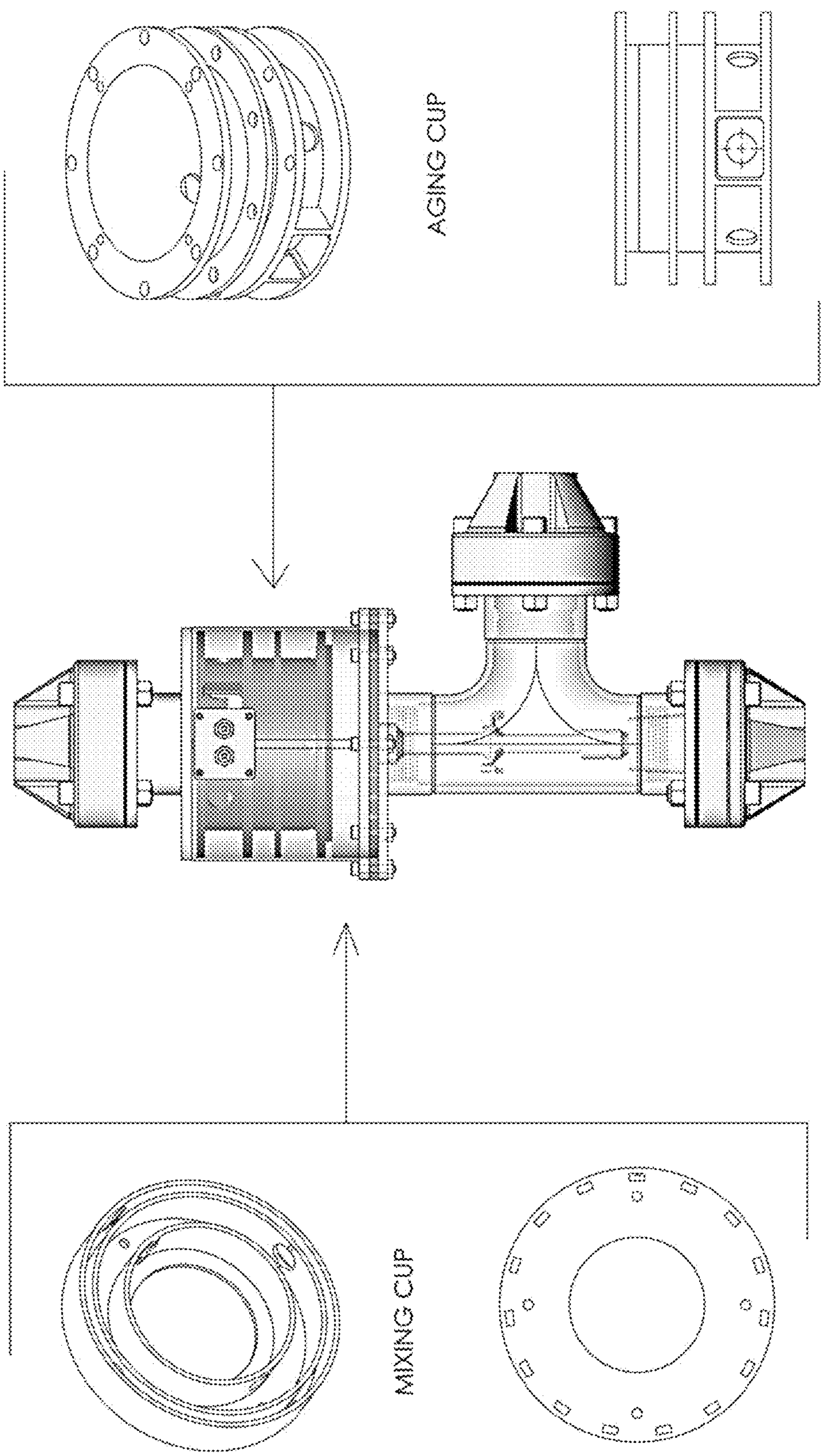
FIG. 16 shows the mixing cup and aging cup of the liquid polymer dosing and mixing pump, in accordance with the principles of the present invention.
Figure 17A:
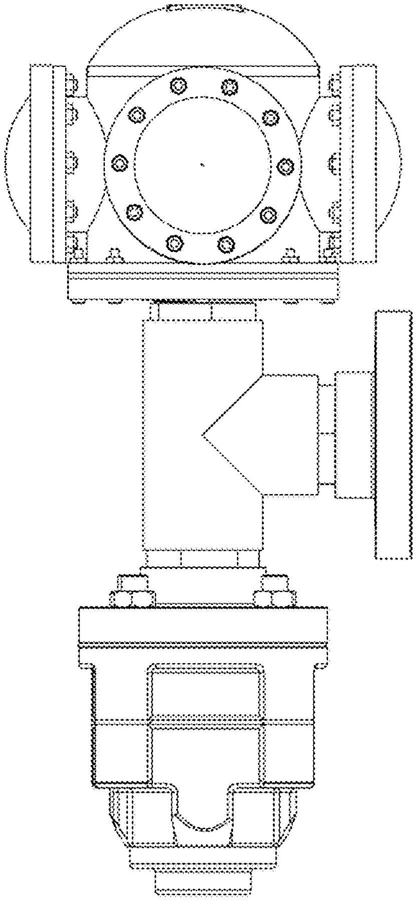
FIGS. 17A-B show side views of the liquid polymer dosing and mixing chamber in which the blending reactor has one inlet.
Figure 17B:
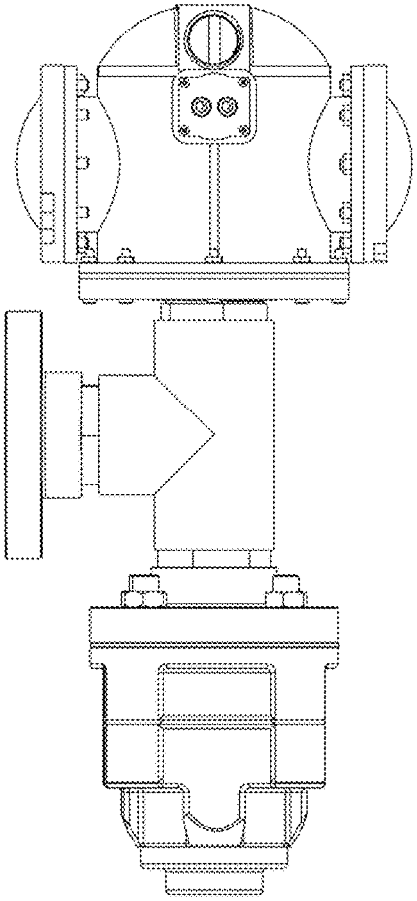
Figure 17C:
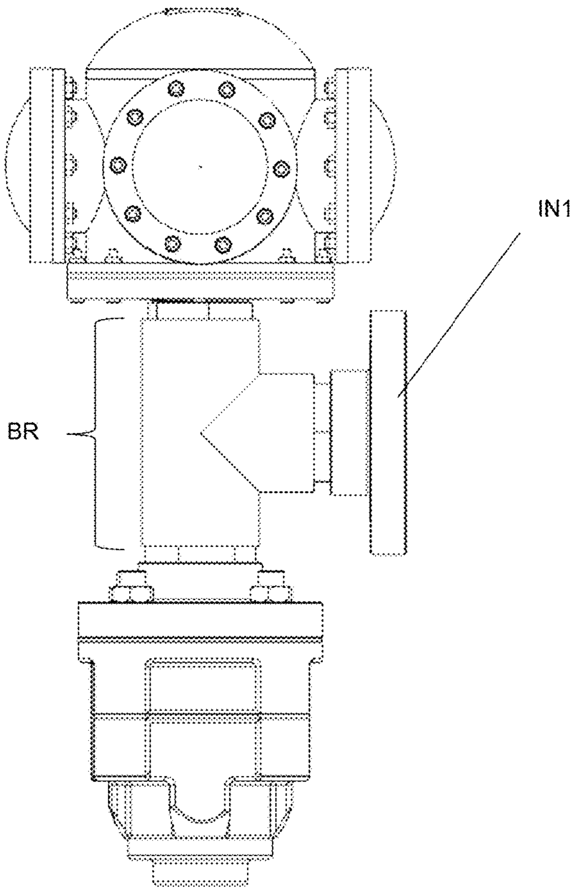
FIGS. 17C-D show front and rear views, respectively, of the liquid polymer dosing and mixing chamber in which the blending reactor has one inlet.
Figure 17D:
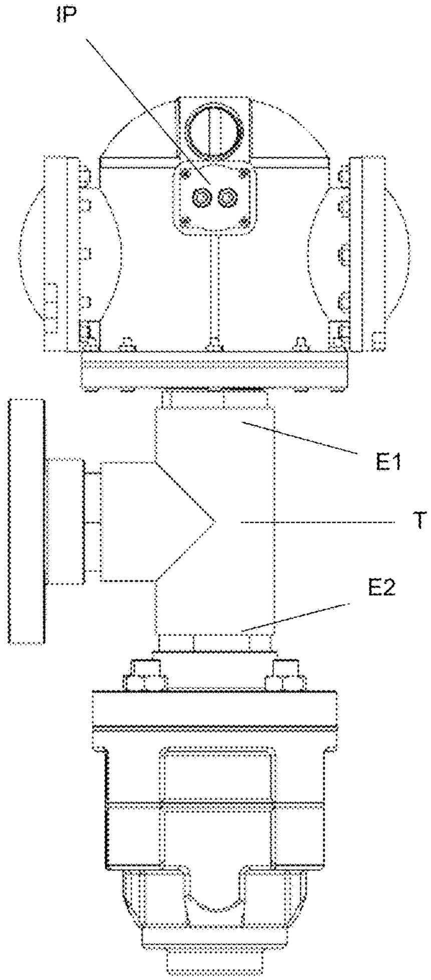
Figure 18A:
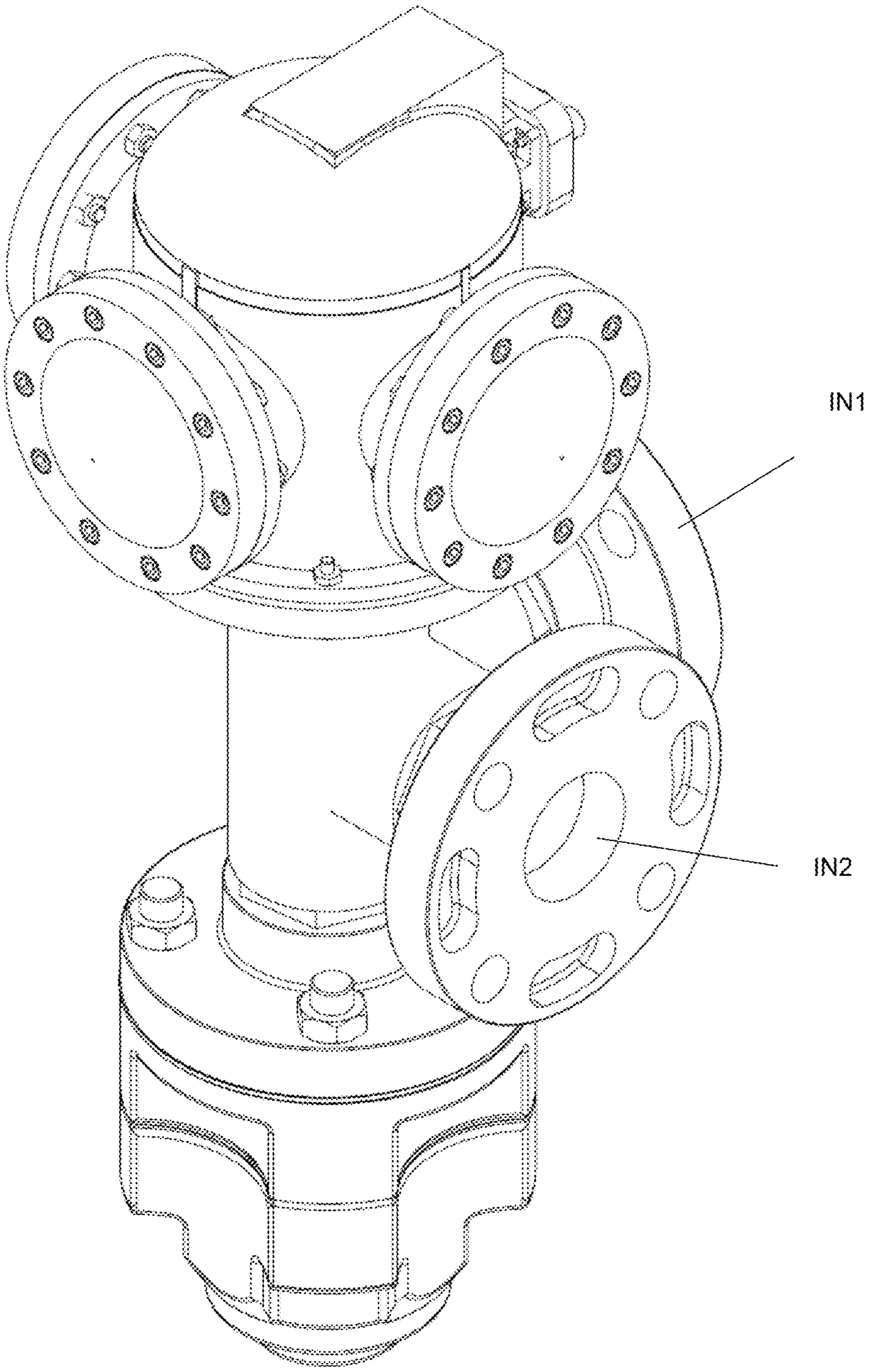
FIGS. 18A-C show embodiments in which the blending reactor of the liquid polymer dosing and mixing chamber includes more than one inlet, in accordance with the principles of the present invention.
Figure 18B:
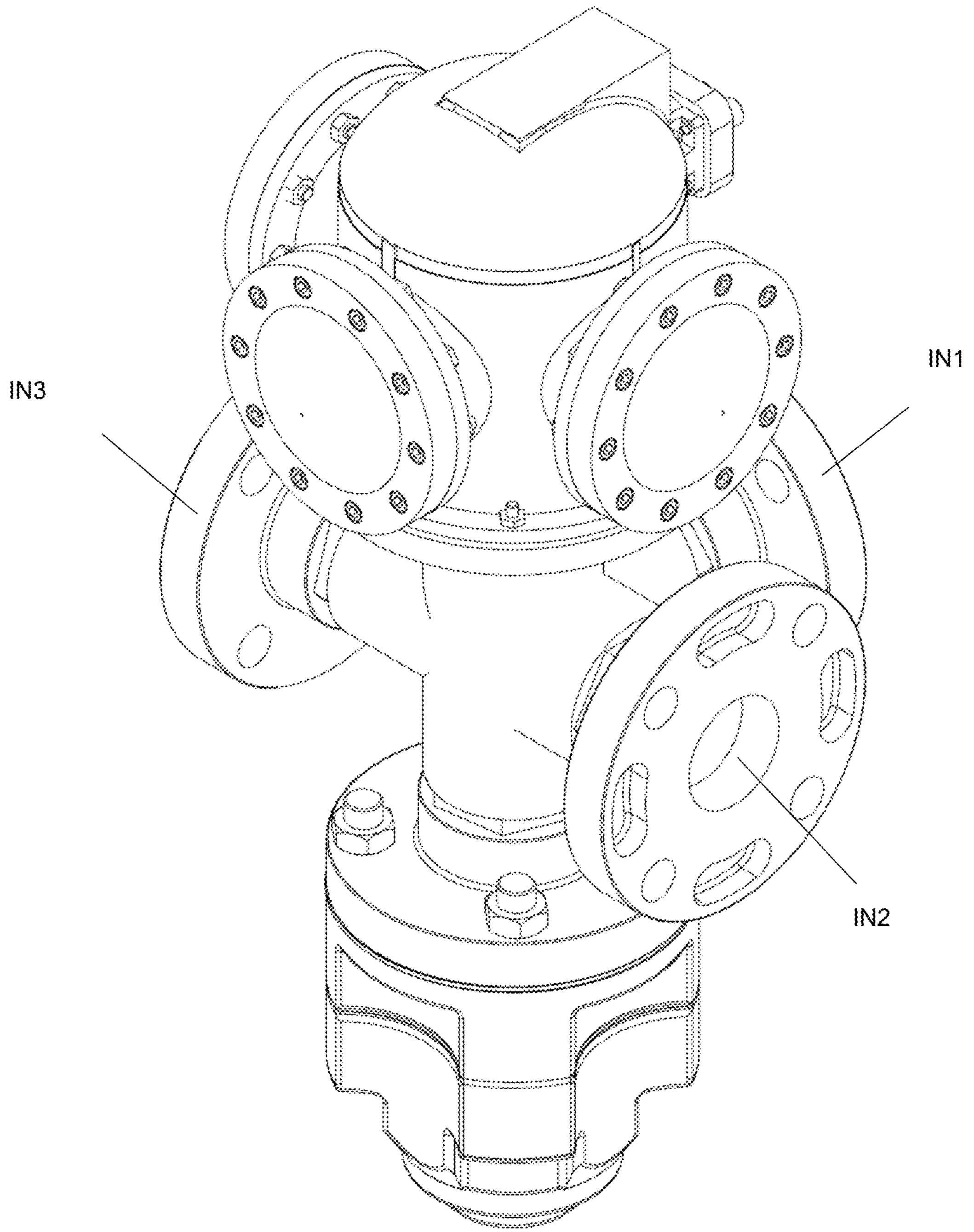
Figure 18C:
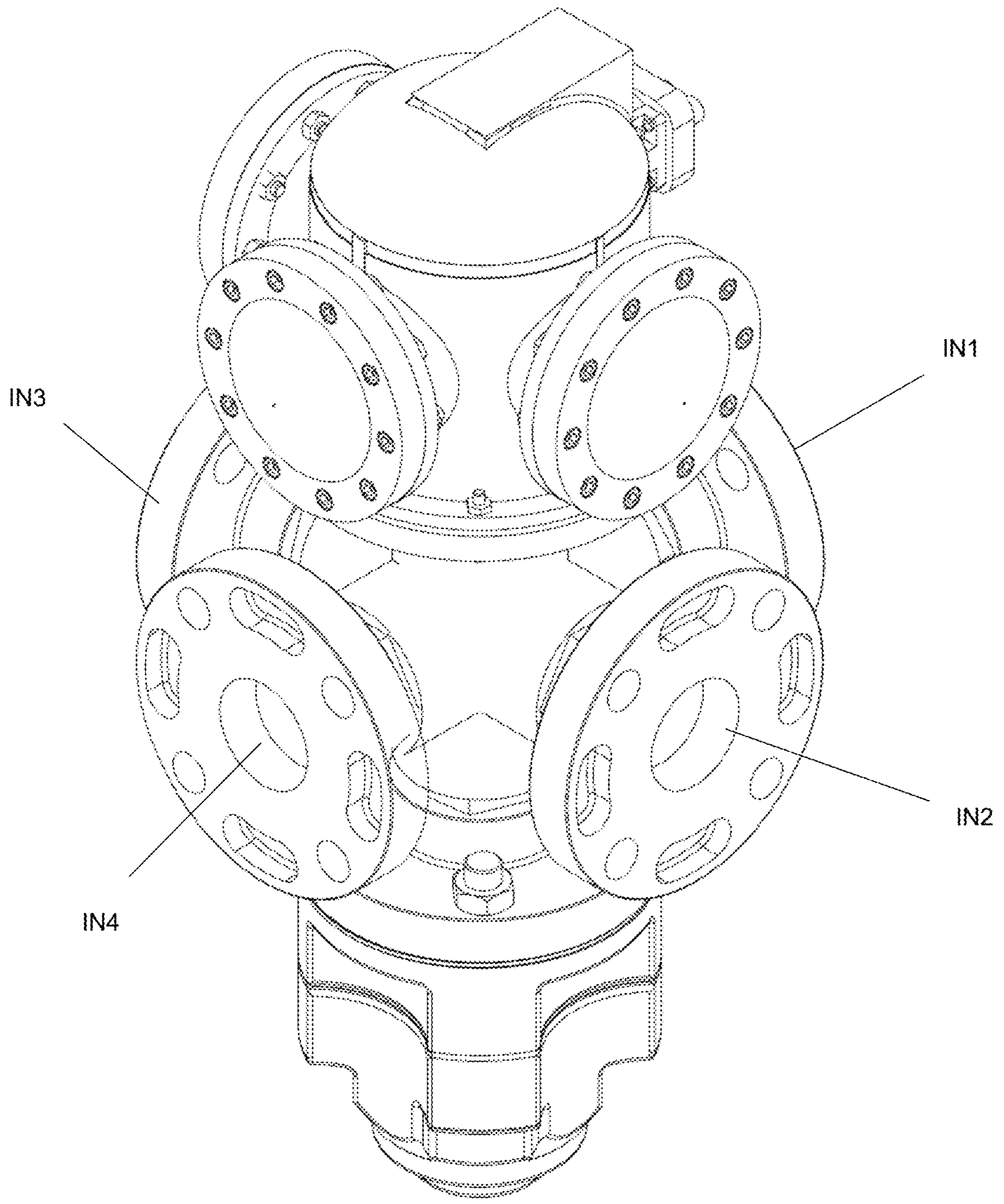
Figure 19A:
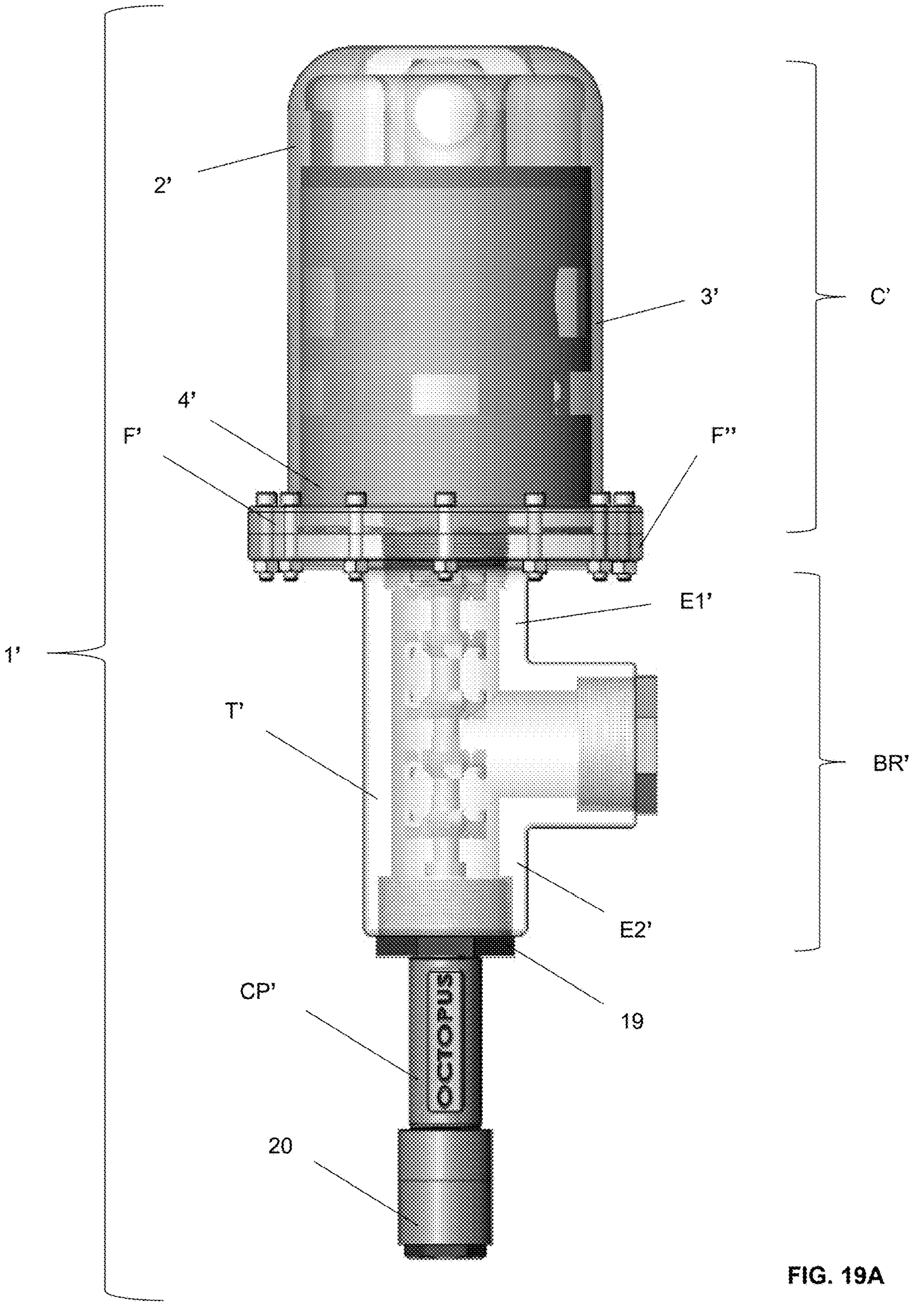
FIGS. 19A-B show an alternate embodiment of the liquid polymer dosing and mixing chamber having a detachable stator, in accordance with the principles of the present invention.
Figure 19B:
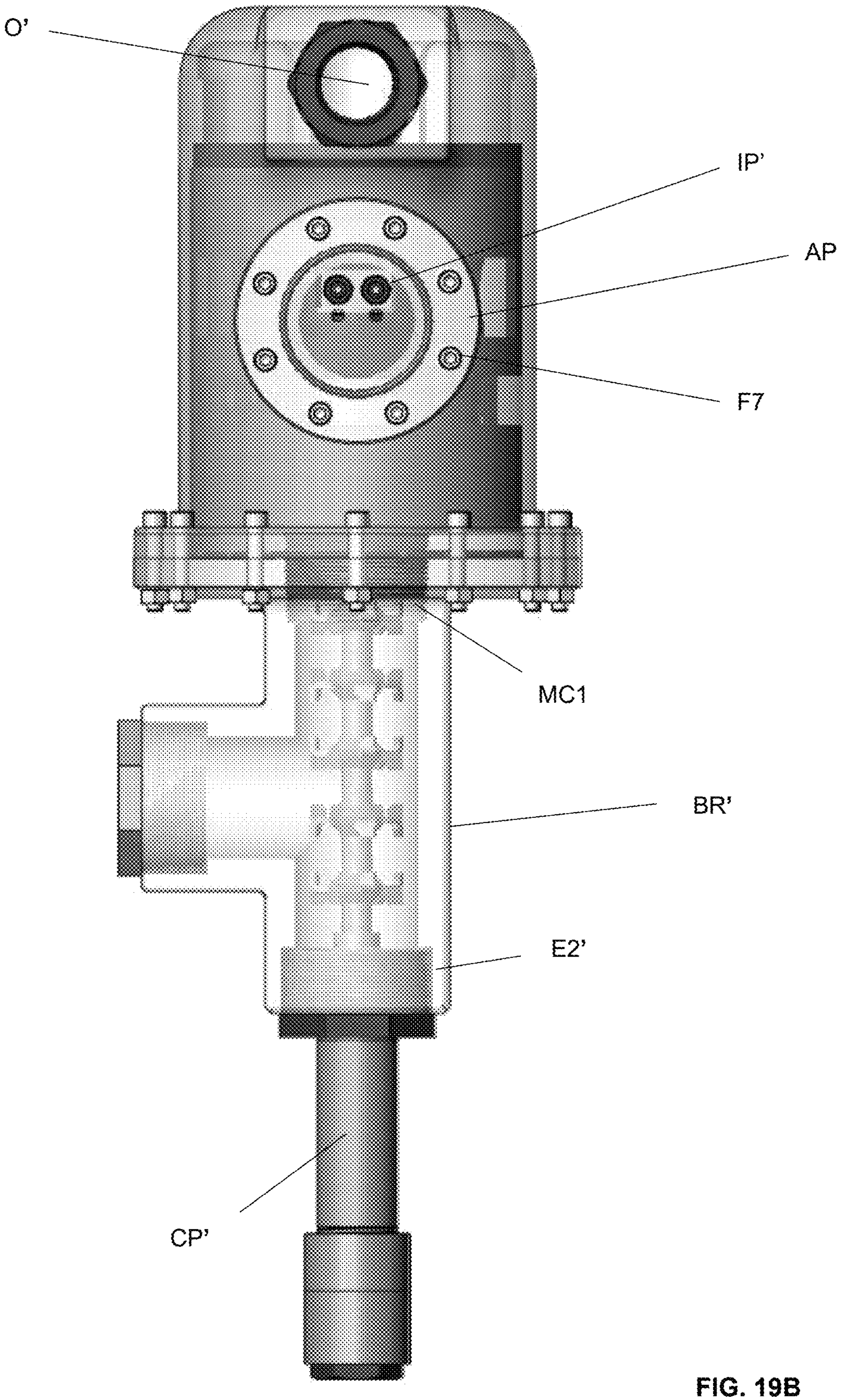
Figure 20A:
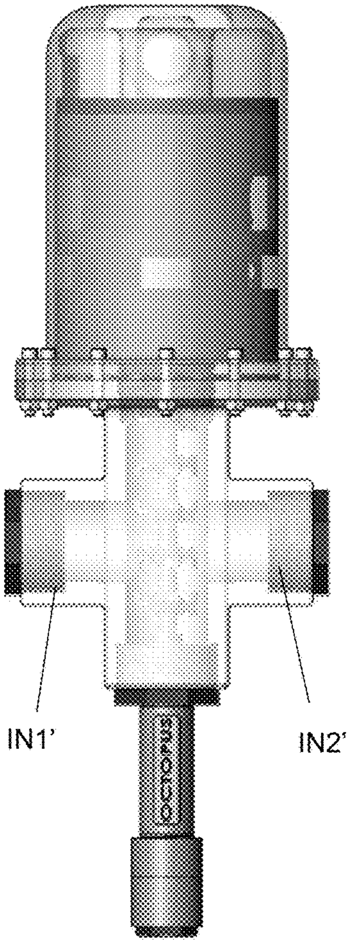
FIGS. 20A-C show versions of the alternate embodiment of the liquid polymer dosing and mixing chamber having between two and four inlets in the blending reactor, in accordance with the principles of the present invention.
Figure 20B:
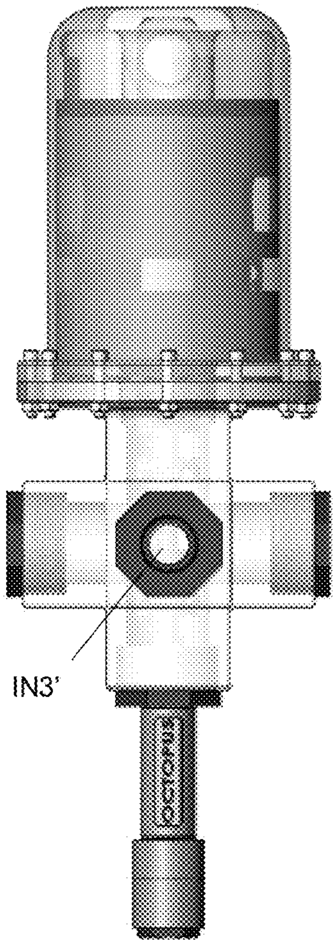
Figure 20C:
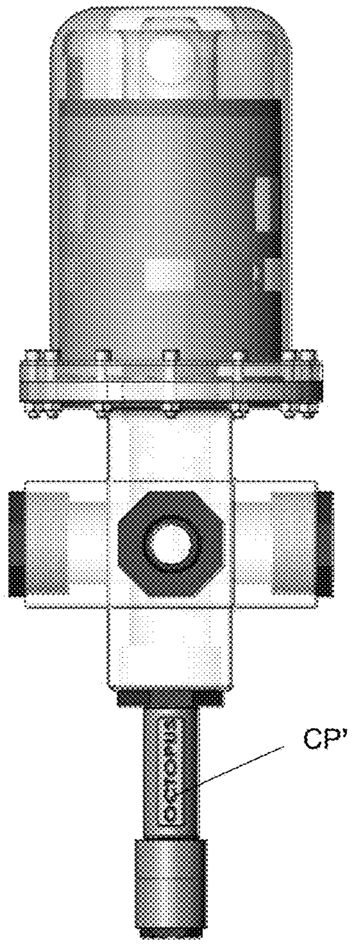

The blending reactor BR2, in turn, comprises a hollow tube UB having a first end N1 and a second end N2, each end opposite to each other, and at least one inlet or nozzle IB1 perpendicularly attached or secured to the hollow tube UB, wherein the first end N1 of the blending rector BR2 comprises a first blending reactor flange FG3, and the second end N2 of the blending rector BR2 comprises a second blending reactor flange FG4. It should be noted that the at least one inlet or nozzle IB1 is configured to receive at least one substance to be mixed inside the hollow tube UB by the one or more impellers IM2, as shown in FIG. 14. The at least one inlet or nozzle IB1 may be secured to the hollow tube UB via one or more screws in a manner similar to how the outlet or nozzle OB is secured to the extension tube TB1. That is, the hollow tube UB may include a tube extension TB2 with a flange FG5 that is adapted to be secured to the inlet or nozzle IB1 via one or more screws F12, F13. As previously indicated, the first end N1 of the blending reactor comprises a first blending reactor flange FG3 that is secured to the second flange FG2 via the one or more screws F10, F11. The second end N2 of the blending rector BR2, in turn, comprises a second blending reactor flange FG4 that is configured to be attached or secured to a progressive cavity pump supporting top 12' via one or more bolts, screws or fasteners F14, F15.

The dosing and mixing chamber 1B further comprises a progressive cavity pump CP2, a progressive cavity pump supporting top 12' (the "PCP supporting top"), and a progressive cavity pump supporting base 13' (the "PCP supporting base"); wherein the progressive cavity pump CP2 comprises a rotor 14' and a stator 15', wherein the rotor 14' is configured to interact and to fit inside the stator 15'; and wherein the progressive cavity pump CP2 is enclosed within the PCP supporting top 12' and PCP supporting base 13'. Such enclosure is possible because both the PCP supporting top 12' and the PCP supporting base 13' include an internal opening or chamber 16C, 16D, respectively, in which the openings 16C, 16D align with one another and are configured to support and/or hold the progressive cavity pump CP2 tightly in place, as shown in FIG. 14. As such, the PCP supporting top 12' and PCP supporting base 13' act as a housing for the progressive cavity pump CP2. The supporting base 13' and supporting top 12' are both secured to the second blending reactor flange FG4 via the one or more bolts, screws, or fasteners F14, F15. To that end, the supporting base 13', supporting top 12' are the second blending reactor flange FG4 all include holes that align with one another and are configured to receive the one or more bolts, screws, or fasteners F14, F15. It should be noted that the rotor 14' is actuated or rotated via the motor 6B. Such rotation is possible because one end of the rotor 14' is adapted to couple with a second end of a shaft extension SE' via a second shaft coupling unit SCU4.

The rotation of the rotor 14' in the progressive cavity pump CP2 creates a vacuum that pulls a first substance from the first inlet IB1 towards the blending reactor BR2. As the first substance passes along the progressive cavity pump CP2, the rotor 14' creates doses of the first substance before it (i.e., the first substance) reaches the blending reactor BR2. Once in the blending reactor BR2, the first substance is mixed, via rotation of the impeller IM2, with a second substance introduced via the inlet 1132. The mixed substances are then led into the mixing cup 5B, where they will continue to mix as they pass along the serrated structure until reaching the aging cup 7B, before being released from the dosing and mixing chamber 1B via the outlet OB.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. A liquid polymer dosing and mixing chamber, comprising:

a hollow chamber, a blending reactor, and a pump housing;

a mixing cup, a submersible actuator, and an aging cup within the hollow chamber;

a shaft extension;

wherein the hollow chamber includes a top portion, a body, and a bottom portion, and wherein the body of the hollow chamber is flanked between the top portion and the bottom portion;

wherein the top portion of the hollow chamber includes at least one outlet configured to release one or more substances that have been mixed in the blending reactor;

wherein the mixing cup comprises an inner wall, an outer wall, and a space located between the inner wall and outer wall, and wherein said space is subdivided into one or more separate sections or compartments;

wherein the inner wall of the mixing cup includes one or more openings corresponding to each section or compartment that are configured to receive the one or more substances coming from the blending reactor;

wherein each section or compartment of the mixing cup includes one or more jagged or serrated protrusions configured to mix the one or more substances coming from the one or more openings, and a plurality of openings configured to lead the substances into the aging cup;

wherein the inner wall of the mixing cup comprises a threaded surface adapted to receive or connect with an NPT male connector from the blending reactor;

wherein the mixing cup includes an opening configured to provide access to the shaft extension;

wherein the aging cup comprises a bottom section, an upper section, an interior section, and an exterior wall, said bottom section being configured to be coupled with the mixing cup via a first group of one or more screws or fasteners;

wherein the bottom section and upper section of the aging cup are flush with each other and between them include an indented or recessed portion that is configured to form a surface on the bottom section of the aging cup having one or more openings that are adapted to receive the substances from the openings in the mixing cup and to direct them, via the exterior wall, towards the upper section of the aging cup;

wherein the upper section comprises one or more openings or windows configured to lead the substances from the exterior wall into the interior section of the aging cup, which leads the substances towards the outlet;

wherein the mixing cup is configured to serve as a support base for the submersible actuator and the interior section of the aging cup is also configured to fit the submersible actuator;

wherein the submersible actuator includes a flange with one or more holes configured to receive the first group of one or more screws or fasteners coupling the aging cup to the mixing cup;

wherein the shaft extension includes a first end and second end;

wherein the submersible actuator is connected to the first end of the shaft extension via a first shaft coupling unit;

wherein shaft extension comprises one or more impellers that are adapted to mix the one or more substances in the blending reactor during operation of the liquid polymer dosing and mixing chamber;

wherein the blending reactor comprises a hollow tube having a body, a first end, and a second end, wherein each end is opposite to each other, and wherein the hollow tube comprises one or more inlets perpendicularly attached to the body of the blending reactor;

wherein the one or more inlets perpendicularly attached to the body of the blending reactor are each configured to receive the one or more substances to be mixed inside the blending reactor by the one or more impellers;

wherein the first end of the blending reactor includes the NPT male connector that is adapted to connect with the threaded surface on the mixing cup;

wherein the first end of the blending reactor is secured to the bottom portion of the hollow chamber;

wherein the pump housing comprises at least one inlet, a progressive cavity pump, a progressive cavity pump supporting top (PCP supporting top), and a progressive cavity pump supporting base (PCP supporting base);

wherein the progressive cavity pump comprises a rotor and a stator, and wherein the rotor is configured to interact with and fit inside the stator;

wherein both the PCP supporting top and the PCP supporting base include an internal opening or chamber, respectively, in which each opening is adapted to align with one another and are configured to hold and enclose the progressive cavity pump in place;

wherein one end of the rotor is adapted to couple with a second end of the shaft extension via a second shaft coupling unit;

wherein the second end of the blending reactor is connected to the PCP supporting top; and wherein the PCP supporting top and the PCP supporting base are secured to each other via one or more fasteners.

2. The liquid polymer dosing and mixing chamber of claim 1, wherein the body of the hollow chamber includes one or more windows configured to provide a view of the interior of the hollow chamber.

3. The liquid polymer dosing and mixing chamber of claim 1, wherein the one or more inlets in the body of the blending reactor each comprise an NPT male connector.

4. The liquid polymer dosing and mixing chamber of claim 1, further comprising a gasket between the PCP supporting top and the PCP support base.

5. The liquid polymer dosing and mixing chamber of claim 1, wherein the hollow chamber compromises a transparent material adapted to provide a view of the chamber's interior.

6. The liquid polymer dosing and mixing chamber of claim 1, wherein the blending reactor comprises a transparent material adapted to provide a view of the interior of the blending reactor.

7. The liquid polymer dosing and mixing chamber of claim 1, wherein the submersible actuator is an electric motor.

8. The liquid polymer dosing and mixing chamber of claim 1, wherein the submersible actuator is a pneumatic motor.

9. The liquid polymer dosing and mixing chamber of claim 1, wherein the submersible actuator is a hydraulic motor.

10. A liquid polymer dosing and mixing chamber, comprising:

a hollow chamber, a blending reactor, and a pump housing;

wherein the hollow chamber includes a top portion, a body, and a bottom portion, and wherein the body of the hollow chamber is flanked between the top portion and the bottom portion;

wherein the top portion of the hollow chamber includes at least one outlet configured to release one or more substances that have been mixed in the blending reactor;

a mixing cup, a submersible actuator, and an aging cup within the hollow chamber;

wherein the mixing cup comprises an inner wall, an outer wall, and a space located between the inner wall and outer wall, and wherein said space is subdivided into one or more separate sections or compartments;

wherein the inner wall of the mixing cup includes one or more openings corresponding to each section or compartment that are configured to receive the one or more substances coming from the blending reactor;

wherein each section or compartment of the mixing cup includes one or more jagged or serrated protrusions configured to mix the one or more substances coming from the one or more openings, and a plurality of openings configured to lead the substances into the aging cup;

wherein the inner wall of the mixing cup comprises a threaded surface adapted to receive or connect with an NPT male connector from the blending reactor;

wherein the aging cup comprises a bottom section, an upper section, an interior section, and an exterior wall, said bottom section being configured to be coupled with the mixing cup via a first group of one or more screws or fasteners;

wherein the bottom section and upper section of the aging cup are flush with each other and between them include an indented or recessed portion that is configured to form a surface on the bottom section of the aging cup having one or more openings that are adapted to receive the substances from the openings in the mixing cup and to direct them, via the exterior wall, towards the upper section of the aging cup;

wherein the upper section comprises one or more openings or windows configured to lead the substances from the exterior wall into the interior section of the aging cup, which leads the substances towards the outlet;

wherein the mixing cup is configured to serve as a support base for the submersible actuator and the interior section of the aging cup is also configured to fit the submersible actuator;

wherein the submersible actuator includes a flange with one or more holes configured to receive the first group of one or more screws or fasteners coupling the aging cup to the mixing cup;

a shaft extension having a first end and second end;

wherein the mixing cup includes an opening configured to provide access to the shaft extension;

wherein the submersible actuator is connected to the first end of the shaft extension via a first shaft coupling unit;

wherein the shaft extension comprises one or more impellers that are adapted to mix the one or more substances in the blending reactor during operation of the liquid polymer dosing and mixing chamber;

wherein the blending reactor comprises a hollow tube having a body, a first end, and a second end, wherein each end opposite to each other, and wherein the hollow tube comprises one or more inlets perpendicularly attached to the body of the blending reactor;

wherein the one or more inlets perpendicularly attached to the body of the blending reactor are each configured to receive the one or more substances to be mixed inside the blending reactor by the one or more impellers;

wherein the first end of the blending reactor includes the NPT male connector that is adapted to connect with the threaded surface on the mixing cup;

wherein the bottom portion of the hollow chamber is connected to the first end of the blending reactor;

a progressive cavity pump having a first end and a second end, wherein the first end of the progressive cavity pump includes a first NPT male connector, and the second end of the progressive cavity pump includes a second NPT male connector;

an inlet that is joined to the second end of the progressive cavity pump;

wherein the second end of the blending reactor is adapted to connect with the first NPT male connector of the progressive cavity pump;

wherein the inlet is adapted to connect with the second NPT male connector of the progressive cavity pump;

wherein the progressive cavity pump comprises a rotor and a stator, and wherein the rotor is configured to interact with and fit inside the stator; and wherein one end of the rotor is adapted to couple with a second end of the shaft extension via a second shaft coupling unit.

11. The liquid polymer dosing and mixing chamber of claim 10, wherein the hollow chamber compromises a transparent material adapted to provide a view of the chamber's interior.

12. The liquid polymer dosing and mixing chamber of claim 10, wherein the blending reactor comprises a transparent material adapted to provide a view of the interior of the blending reactor.

13. The liquid polymer dosing and mixing chamber of claim 10, further comprising one or more access points or doors on the body of the hollow chamber configured to provide access to the interior of the hollow chamber.

14. The liquid polymer dosing and mixing chamber of claim 10, wherein the submersible actuator is an electric motor.

15. The liquid polymer dosing and mixing chamber of claim 10, wherein the submersible actuator is a pneumatic motor.

16. The liquid polymer dosing and mixing chamber of claim 10, wherein the submersible actuator is a hydraulic motor.

17. A dosing and mixing chamber, comprising:
one or more inlets;
at least one outlet;
a blending reactor;
a mixing cup;
a submersible actuator;
an aging cup;
a compartment joined to the blending rector that is configured to house or enclose the mixing cup, the submersible actuator, and the aging cup;
wherein the submersible actuator is connected to a first end of a shaft extension via a first shaft coupling unit;
wherein the shaft extension comprises one or more impellers that are adapted to mix one or more substances inside of the blending reactor;
wherein a top end of the compartment includes a tube extension having a first flange, wherein the outlet is adapted to be secured to the first flange;
wherein a bottom end of the compartment includes a second flange;
wherein the first flange and the outlet both include one or more holes that align with each other and are configured to receive a first group of one or more screws, bolts, or fasteners adapted to secure the outlet to the tube extension;
wherein the blending reactor comprises a hollow tube having a first end and a second end opposite to each other, and at least one inlet perpendicularly attached to the hollow tube, wherein the inlet is configured to receive one or more substances to be mixed inside the blending reactor by the one or more impellers;
wherein the first end of the blending rector comprises a first blending reactor flange, and the second end of the blending rector comprises a second blending reactor flange;
wherein both the second flange of the compartment and the first blending reactor flange include one or more holes that align with each other and are configured to receive a second group of one or more screws, bolts, or fasteners, thereby securing the first blending reactor flange to the second flange via the second group of one or more screws, bolts, or fasteners;
wherein the dosing and mixing chamber further comprises a progressive cavity pump, a progressive cavity pump supporting top (the "PCP supporting top"), and a progressive cavity pump supporting base;
wherein the progressive cavity pump comprises a rotor and a stator, and wherein the rotor is configured to interact and fit inside the stator;
wherein both the PCP supporting top and the PCP supporting base include an internal opening or chamber, respectively, in which each opening is adapted to align with one another and are configured to hold and enclose the progressive cavity pump in place;
wherein one end of the rotor is adapted to couple with a second end of the shaft extension via a second shaft coupling unit;
wherein the second blending reactor flange is configured to be secured to the progressive cavity pump supporting top via a third group of one or more bolts, screws, or fasteners; and
wherein the PCP supporting top and the PCP supporting base are secured to each other via the third group of one or more bolts, screws, or fasteners.

18. The dosing and mixing chamber of claim 17, wherein each of the one or more inlets comprise a nozzle.

19. The dosing and mixing chamber of claim 17, wherein the at least one outlet comprises a nozzle.

* * * * *